US012393320B2

(12) United States Patent
Fredericks et al.

(10) Patent No.: US 12,393,320 B2
(45) Date of Patent: Aug. 19, 2025

(54) AUTOMATED TESTING OF MOBILE DEVICES USING BEHAVIORAL LEARNING

(71) Applicant: T-Mobile USA, Inc., Bellevue, WA (US)

(72) Inventors: Tor Fredericks, Bellevue, WA (US); Dong Chen, Lansing, MI (US)

(73) Assignee: T-Mobile USA, Inc., Bellevue, WA (US)

( * ) Notice: Subject to any disclaimer, the term of this patent is extended or adjusted under 35 U.S.C. 154(b) by 182 days.

(21) Appl. No.: 17/674,557

(22) Filed: Feb. 17, 2022

(65) Prior Publication Data

US 2022/0171510 A1 Jun. 2, 2022

Related U.S. Application Data

(63) Continuation-in-part of application No. 17/094,741, filed on Nov. 10, 2020.

(51) Int. Cl.
*G06N 5/04* (2023.01)
*G06F 3/041* (2006.01)
(Continued)

(52) U.S. Cl.
CPC .......... *G06F 3/0484* (2013.01); *G06F 3/0481* (2013.01); *G06N 5/022* (2013.01);
(Continued)

(58) Field of Classification Search
CPC ................. G06F 3/0481; G06F 3/0484; G06F 11/3447–3466; G06F 11/36–3608;
(Continued)

(56) References Cited

U.S. PATENT DOCUMENTS 7,102,765 B1 * 9/2006 Abi-Saleh .......... G09B 19/0053
358/468
8,862,118 B2 10/2014 Whidden
(Continued)

FOREIGN PATENT DOCUMENTS

EP 3477923 A1 5/2018
WO WO-2021061185 A1 * 4/2021

OTHER PUBLICATIONS

Vuong et al., "A Reinforcement Learning Based Approach to Automated Testing of Android Applications", published by ACM, A-TEST '18, Nov. 5, 2018, Lake Buena Vista, FL, USA, pp. 31-37 (Year: 2018).*

(Continued)

*Primary Examiner* — Anibal Rivera
(74) *Attorney, Agent, or Firm* — Lee & Hayes, P.C.

(57) ABSTRACT

Described herein are techniques that may be used to automate testing of services on mobile devices using visual analysis. In some embodiments, a behavioral model or other machine learning model is trained using training data collected while testers use mobile devices to test the services. During execution of a testing routine on a mobile device, screenshots are obtained of a screen of the mobile device and provided to the machine learning model. The behavioral model or other machine learning model can use the provided screenshot to determine an action that simulates a user action (e.g., a user touch on the screen of the mobile device) at a location of an icon or other visual element associated with the testing routine. These steps are repeated until an end-state of the testing routine is detected.

20 Claims, 12 Drawing Sheets

(51) Int. Cl.
*G06F 3/0481* (2022.01)
*G06F 3/0484* (2022.01)
*G06N 5/022* (2023.01)
*G06V 20/50* (2022.01)
*G06V 20/62* (2022.01)
*G06V 30/19* (2022.01)

(52) U.S. Cl.
CPC .............. *G06V 20/50* (2022.01); *G06V 20/63* (2022.01); *G06V 30/19* (2022.01)

(58) Field of Classification Search
CPC ........ G06V 20/50; G06V 20/63; G06V 30/19; G06N 5/022; G06N 99/055
See application file for complete search history.

(56) References Cited

U.S. PATENT DOCUMENTS

| | | | |
|---|---|---|---|
| 8,990,774 B2 | 3/2015 | Amintafreshi | |
| 9,519,570 B2 | 12/2016 | Srinivasan | |
| 10,853,232 B2 | 12/2020 | Henry et al. | |
| 10,909,503 B1 | 2/2021 | Dias et al. | |
| 11,734,581 B1* | 8/2023 | Badr | G06F 21/44 719/328 |
| 2008/0148235 A1 | 6/2008 | Foresti | |
| 2011/0310041 A1 | 12/2011 | Williams et al. | |
| 2012/0243745 A1 | 9/2012 | Amintafreshi | |
| 2015/0269059 A1 | 9/2015 | Srinivasan | |
| 2018/0197103 A1* | 7/2018 | Petursson | G06N 20/00 |
| 2019/0042976 A1* | 2/2019 | Tanglertsampan | G06N 20/00 |
| 2019/0227916 A1 | 7/2019 | Yedalla | |
| 2020/0117577 A1 | 4/2020 | Saxena et al. | |
| 2020/0379889 A1 | 12/2020 | Hamid | |
| 2021/0081294 A1 | 3/2021 | Golubev | |
| 2021/0081308 A1 | 3/2021 | Golubev | |
| 2021/0089438 A1 | 3/2021 | Gardner et al. | |
| 2021/0099736 A1* | 4/2021 | Soto | H04N 21/44227 |
| 2021/0203782 A1* | 7/2021 | Vymenets, Jr. | H04M 3/5175 |
| 2022/0004898 A1 | 1/2022 | Sinha et al. | |
| 2022/0147437 A1 | 5/2022 | Chen et al. | |
| 2022/0206931 A1* | 6/2022 | Hwang | G06F 11/3692 |

OTHER PUBLICATIONS

Garousi et al., "Visual GUI testing in practice: An extended industrial case study", published by Cornell University [Submitted on May 19, 2020 (v1), last revised May 20, 2020 (this version, v2)], pp. 1-33 (Year: 2020).*

Borges Jr. et al., "Guiding App Testing with Mined Interaction Models", published by IEEE, 2018 ACM/IEEE 5th International Conference on Mobile Software Engineering and Systems, pp. 133-143 (Year: 2018).*

Tsung-Hsiang Chang et al., GUI Testing Using Computer Vision, Apr. 10-15, 2010, [Retrieved on Mar. 20, 2025]. Retrieved from the internet: <URL: https://dl.acm.org/doi/pdf/10.1145/1753326.1753555> 10 Pages (1535-1544) (Year: 2010).*

Office Action for U.S. Appl. No. 17/094,741, mailed on Apr. 13, 2023, Dong Chen, "Automated Testing of Mobile Devices Using Visual Analysis," 19 pages.

Office Action for U.S. Appl. No. 17/094,741, mailed on Aug. 23, 2023, Chen, "Automated Testing of Mobile Devices Using Visual Analysis", 18 Pages.

Office Action for U.S. Appl. No. 17/094,741, mailed on Oct. 3, 2022, Dong Chen, "Automated Testing of Mobile Devices Using Visual Analysis", 20 pages.

Bhanapal et al., "An Innovative System for Remore and Automated Testing of Mobile Phone Applications", IEEE, 2012 Service Research and Innovation Institute Global Conference, pp. 44-54.

Bo et al., "MobileTest: A Tool Supporting Automatic Black Box Test for software on Smart Mobile Devices", IEEE, computer society, Second International Workshop on Automation of Software Test (AST'07), pp. 1-7.

* cited by examiner

AUTOMATED TESTING OF MOBILE DEVICES USING BEHAVIORAL LEARNING

PRIORITY

The present application is a continuation-in-part of, and claims priority to, U.S. patent application Ser. No. 17/094,741, filed on Nov. 10, 2020, entitled "AUTOMATED TESTING OF MOBILE DEVICES USING VISUAL ANALYSIS," now U.S. Pat. No. 12,026,084, the entirety of which is incorporated herein by reference.

BACKGROUND

A number of service providers provide services that are implemented across a number of different types (e.g., models) of electronic devices. For example, a wireless carrier may provide cellular service that is accessible to a large variety of different mobile devices. In this example, the service may be available to mobile devices of different brands, models, and/or operating systems. However, providing services to a large number of different types of devices can be problematic. For example, when a service provider wishes to update its services, those updates must be tested out on each of the number of different types of devices to ensure continued availability of the services.

SUMMARY

Techniques are provided herein for enabling automated testing of mobile devices using visual analysis. In some embodiments, these techniques involve a process that begins with capturing screenshot images from a mobile device. Provided that a failure is not detected via the screenshot, the process then involves determining an icon or other visual element within the screenshot that is to be selected. One or more machine vision techniques (e.g., optical recognition) may be used to identify a location of the icon or other visual element within the screenshot image. The process then involves simulating an action (e.g., a user touch) at the identified location. This process is repeated until a testing routine is either completed or failed.

In one embodiment, a computer-implemented method includes receiving, during a testing routine associated with a user goal on a mobile device, a screenshot of the mobile device. The computer-implemented method also includes dynamically determining, using a behavioral model, an object shown in the screenshot to select with a simulated user action. The behavioral model includes a machine learning model trained on a set of training data indicating behavior of one or more users to achieve the user goal on one or more test devices. The selection of the object is predicted, by the behavioral model, to cause progress towards achievement of the user goal on the mobile device. The computer-implemented method also includes causing selection of the object on the mobile device.

In another embodiment, one or more computing devices include one or more processors and memory storing computer-executable instructions that, when executed by the one or more processors, cause the one or more processors to perform operations. The operations include receiving, during a testing routine associated with a user goal on a mobile device, a screenshot of the mobile device. The operations also include dynamically determining, using a behavioral model, an object shown in the screenshot to select with a simulated user action. The behavioral model includes a machine learning model trained on a set of training data indicating behavior of one or more users to achieve the user goal on one or more test devices. The selection of the object is predicted, by the behavioral model, to cause progress towards achievement of the user goal on the mobile device. The operations further include causing selection of the object on the mobile device.

In a further embodiment, one or more non-transitory computer-readable media store computer-executable instructions that, when executed by one or more processors, cause the one or more processors to perform operations. The operations include receiving, during a testing routine associated with a user goal on a mobile device, a screenshot of the mobile device. The operations also include dynamically determining, using a behavioral model, an object shown in the screenshot to select with a simulated user action. The behavioral model comprises a machine learning model trained on a set of training data indicating behavior of one or more users to achieve the user goal on one or more test devices. The selection of the object is predicted, by the behavioral model, to cause progress towards achievement of the user goal on the mobile device. The operations further comprise causing selection of the object on the mobile device.

Embodiments of the disclosure provide several advantages over conventional techniques. For example, conventional automated testing techniques for mobile devices have limited adaptability. The embodiments described herein, on the other hand, provide for the ability to automate testing for a mobile device in a manner such that the testing is adapted to changes made to that mobile device. Such automated testing techniques can be performed even if significant changes are made to various elements of the mobile device. For example, even if the names and/or locations of various icons are changed on a mobile device/operating system, the testing techniques can still be completed.

In some embodiments of the proposed system, tests conducted by testers are used to train a machine learning model on what visual objects are to be selected and in what order. During training, each time that a tester selects a visual object, a screenshot is captured and a location on the screenshot can be associated with a step in a testing routine. In this way, the machine learning model can be trained so that testing a particular model of mobile phone requires selecting this location/icon, then selecting this location/icon, etc. The system would not require testing scripts and would be able to automatically adapt testing to mobile devices and operating systems (OS) that require additional/fewer steps. Additionally, embodiments of the disclosure can be easily migrated to new phone models without any code-level changes which means the system can perform the tests automatically. In such embodiments, there is no need to design testing flows which are needed in conventional testing automation systems.

In other embodiments, tests conducted by testers are used to train a machine learning model, such as a behavioral model, to dynamically predict which visual object to select to perform a next action during a testing routine. The machine learning model can be trained to dynamically predict which visual objects to select during testing routines on different types of device models, operating systems, and/or user interfaces, despite differences between devices. Accordingly, the machine learning model can allow testing routines to be performed on different types of devices even if testing routines associated with the same user goal, such as making a call or sending a text message, on different types of devices involve different steps and/or different orders of steps.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
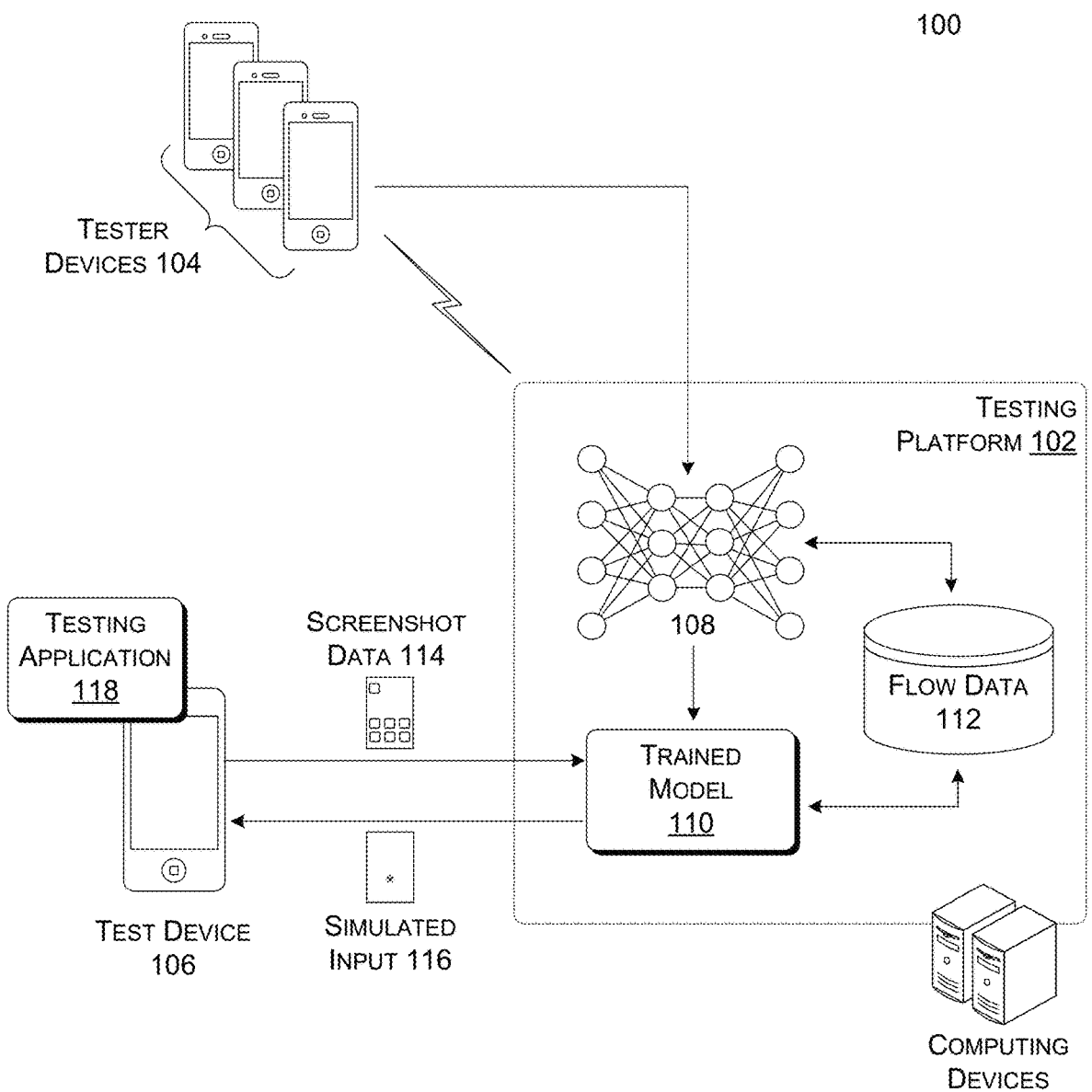
FIG. 1 illustrates an example architecture of a testing system that provides for automated testing of a mobile device using analysis of visual data in accordance with some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to automate testing of services on mobile devices using visual analysis. Conventionally, when an operator of a service that is provided to multiple types of devices, or devices with multiple types of software (e.g., operating systems), wishes to make an update to that service, the update may first be tested in relation to each of the multiple types of devices and/or types of software. This can be time consuming and expensive, especially when updates are frequently made to the service. Automated testing can be used to reduce the time and expense associated with testing. However, such automated testing must simulate how a user would naturally use the device in order to be effective. In the case of mobile devices, this means that functions and applications are accessed via selection of an icon on the screen of the mobile device. While automated testing techniques exist that rely upon the use of text elements associated with those icons, such testing techniques are fallible. For example, an automated testing technique may store an indication of an icon name to be called at a certain point in the test. However, if a developer associated with that icon changes the icon name, then the whole test will be failed when the icon is unable to be accessed. Accordingly, existing automated testing techniques are not capable of automatically adapting to device changes.

A testing routine is a series of steps performed on a mobile device to complete a test of hardware and/or software on the mobile device. A testing routing may be associated with a particular function of the mobile device and/or a user goal (e.g., make a call). In some embodiments, a testing platform as described herein may maintain a data store of testing "flows." A testing flow, for the purposes of this disclosure, may include an ordered series of steps generated by a user (e.g., an administrator) to be performed during execution of a testing routine on a mobile device. In some embodiments, separate testing flows may be maintained for each combination of type of mobile device and mobile device operating system. In other embodiments, instead of performing a testing routine according to a testing flow that defines a predefined order of steps, and/or may be specific to a particular type of mobile device or operating system, a behavioral model can be configured to dynamically execute a testing routine on any type of mobile device or mobile device operating system. As discussed further below, the behavioral model can be a deep learning model or other type of machine learning model.

In embodiments as described herein, a machine learning model is trained using interaction data received from a number of mobile devices by correlating user selections with visual elements (e.g., icons). In embodiments, during execution of a testing routine on a mobile device, screenshots are obtained of a current screen of the mobile device and provided to the machine learning model. Instructions are generated based on the provided screenshot that simulate a user action (e.g., a user touch on the screen of the mobile device) at a location of an icon or other visual element associated with the testing routine. These steps are repeated until an end-state of the testing routine is detected.

FIG. 1 illustrates an example architecture 100 of a testing system that provides for automated testing of a mobile device using analysis of visual data in accordance with some embodiments. In the testing system, a testing platform 102 is in communication with multiple mobile devices (e.g., tester devices 104) operated by a number of testers/operators. The testing platform 102 may be further in communication with a mobile device (e.g., test device 106) for which testing is to be automated.

A testing platform 102 may be comprised of a number of computing devices and may provide automated testing for a number of test devices. For example, the testing platform may be implemented as a software application installed upon a number of computing devices that execute instances of testing software. In some embodiments, the computing devices may comprise a distributed network of computing nodes (e.g., a cloud computing environment).

The computing devices of the testing platform 102 may include instructions that implement a machine learning algorithm 108. The machine learning algorithm 108 may be trained using data received from the tester devices 104 to generate a trained model 110. The data received from the tester devices may include interaction traces that include any suitable information on interactions between the tester and the tester device. In some embodiments, flow data 112 may be generated that includes an ordered series of steps to be taken during a training routine. Each step in the ordered series of steps may include an indication of a visual element to be selected during that step. As described further below, in some examples the flow data 112 can be used by the trained model 110 to determine a next step to perform during a training routine. In other examples, the flow data 112 can be used to generate training data the machine learning algorithm 108 can use to train the trained model 110, such that the trained model 110 can dynamically predict a next step to perform during a training routine without directly following an ordered series of steps defined in the flow data 112.

The machine learning algorithm 108 may include any suitable machine learning techniques that may be used to learn processes performed by testers. For example, the machine learning algorithm 108 may include a deep learning neural network. In some embodiments, the machine learning algorithm 108 may be trained on data provided by a number of tester devices 104. For example, the machine learning algorithm 108 may receive screenshot data from the tester devices 104 as well as user input data corresponding to actions taken by a tester/operator of the tester devices 104 with respect to the screenshot data. The screenshot data may include images captured from a screen of the tester device 104. In some examples, the screenshot data can be captured via software executing on the tester device 104 that is configured to capture screenshots of images displayed on the screen of the tester device 104, or to capture video of images displayed on the screen of the tester device 104 and to extract screenshots from the captured video. In other examples, the screenshot data can be captured via an external camera oriented toward a screen of the tester device 104, such that the external camera can take pictures or video of screens of the tester device 104. Screenshot images are also referred to herein as snapshots. The tester input data may include an indication of an action taken by the tester of the tester device on the screen of the test device 106. For example, the tester input data may include a location upon the screen of the tester device selected (e.g., touched) by the tester. The machine learning algorithm 108 may then generate the trained model 110 to include a correspondence between screenshot data and the tester input data.

A mobile device (such as tester devices 104 or the test device 106) is any electronic device that is capable of establishing a communication session with another electronic device. In some embodiments, a mobile device may include in its memory a mobile application that enables at least a portion of the functionality described herein. In some embodiments, a test device 106 may be capable of remotely executing actions instructed by the testing platform 102. For example, the testing platform may cause the test device 106 to capture a current screenshot 114 from a screen of the test device 106 that is then provided to the testing platform 102. In other examples, the testing platform can cause the test device 106 to capture video from a screen of the test device 106, and extract a screenshot 114 from the captured video. In still other examples, an external camera oriented toward the screen of the test device 106 can take pictures or video of the screen of the test device 106, and provide screenshot data 114 derived from the pictures or video to the testing platform 102.

In some embodiments, the testing platform 102 may be in communication with a number of test devices 106, each of which are of a different type (e.g., model) and/or operating system. The testing platform 102 may communicate with the test device 106 via any suitable connection. For example, the test device 106 may communicate with the testing platform 102 via a wired or wireless communication mechanism.

In some embodiments, the screenshot 114 may be processed by the testing platform 102 based on a flow associated with a testing routine being performed. Information related to such a flow may be stored in flow data 112. In such embodiments, each step in a flow associated with a testing routine may include an indication of visual identifier (e.g., an icon) that represents an area to be selected for the step. For example, executing a testing routine on the test device 106 may first involve retrieving a flow for the testing routine from the flow data 112. Executing the testing routine may then involve repeating a process that includes capturing a screenshot on the test device 106, using one or more optical recognition techniques to identify an area matching a target visual identifier for a current step of the retrieved flow, and providing instructions to the test device 106 that causes the identified area to be selected. This process may be repeated for each step in the flow. In some embodiments, the testing routine may be failed if a captured screenshot does not include the target visual identifier. The testing routine may be passed upon reaching the end of the retrieved flow without detecting a failure.

In other embodiments, the screenshot 114 associated with the test device 106 can be processed by the testing platform 102 dynamically using a trained model 110, without using a static or predefined flow of steps defined by flow data 112. For example, as discussed further below, the trained model 110 can be a behavioral model that is trained on interaction data generated by the tester devices 104 when the tester devices 104 are operated by testers according to a series of steps indicated by flow data 112 associated with a testing routine. However, once the behavioral model has been trained, the training of the behavioral model can cause the behavioral model to dynamically determine or predict a next action to perform during a testing routine executed on the test device 106, instead of sequentially following a pre-ordered series of steps defined by flow data 112. For instance, rather than progressing through a predefined series of actions defined by flow data 112, the trained behavioral model can use a screenshot 114 showing a current state of the test device 106 to dynamically predict which action should be performed next on the test device 106 during a testing routine.

The screenshot 114 may be processed as input to the trained model 110 in order to execute a testing routine on the test device 106. In some examples, the trained model 110 can evaluate the screenshot 114 to determine which step of a predefined series of steps indicated in flow data 112 is to be performed on the test device 106 next during the testing routine. In other examples, the trained model 110 may not directly use flow data 112 during execution of the testing routine on the test device 106. For example, rather than the trained model 110 determining a next action by retrieving a flow from the flow data 112, the trained model 110 can be a behavioral model that has been trained to dynamically determine the next action, based on training data generated according to the flow data 112. For instance, the trained model 110 can use a current screenshot 114 of the test device 106 to dynamically determine a next action to be performed, during the testing routine, based on behavior learned from testers/operators that may have been following a flow defined in flow data 112 during generation of training data on the tester devices 104. The testing routine executed on the test device 106 may include as many, or as few, steps as are typically performed for a testing routine typically performed on tester devices 104 of the same type or operating system as the test device 106, or of different types or operating systems.

In some embodiments, execution of a testing routine may be performed on the test device by a testing application 118 installed upon, and executed from, the test device 106. For example, a testing application 118 may comprise a software application that causes the test device 106 to establish communication with the testing platform 102. For example, as discussed further below, a testing application executing on the test device 106 may receive, from the testing platform 102, an indication of a user input to be executed on the test device 106, and can cause the test device 106 to execute that user input. For example, the testing application can simulate a user's touch on a screen of the test device 106 at a specified location, for instance by sending a set of screen coordinates (e.g., the location) and a touch input to an API of an operating system program module of the test device 106 responsible for processing screen touch inputs. In other examples, execution of a testing routine may be performed on the test device 106 by a robotic arm or other mechanism that is configured to physically contact the screen and/or other input elements of the test device 106 at locations specified in instructions determined by the testing platform 102. For example, the testing platform 102 can include robotic arms, or other mechanisms, configured to simulate user actions on test devices via physical contact with the test devices, for instance to simulate user touches on mobile device screens.

A number of interactions may occur between various components of the architecture 100 during a process in which automated testing of a test device may be performed. In this process, testing may initially be performed via a number of tester devices 104 that are operated by testers running a testing routine. During the testing routine, screenshots may be captured from the screen of the mobile device after each action performed by the tester. The screenshots are provided to a testing platform along with an indication of each action performed by the tester. The action data and screenshot data are then provided, as training data, to a machine learning algorithm that creates a trained model based on the training data in which tester actions are corresponded to visual elements within the screenshot data.

Once a trained model 110 has been generated, a testing routine may be performed on a test device 106 in an automated manner using that trained model 110. To do this, a screenshot 114 may be captured of a screen of the test device 106. In some embodiments, the trained model 110 may then be used to correlate a tester action with portions of the captured screenshot, and thereby determine which action to perform next on the test device 106. In other embodiments, the trained model 110 may be used to dynamically predict a next action to perform on the test device 106 based on the input screenshot 114. Accordingly, the trained model 110 may be used to generate a set of instructions that, when executed, simulate a user input 116 to be executed on the test device 106. After the user input 116 is executed on the test device 106, another screenshot is captured, and another user interaction may be determined for the test device 106 based on that screenshot.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
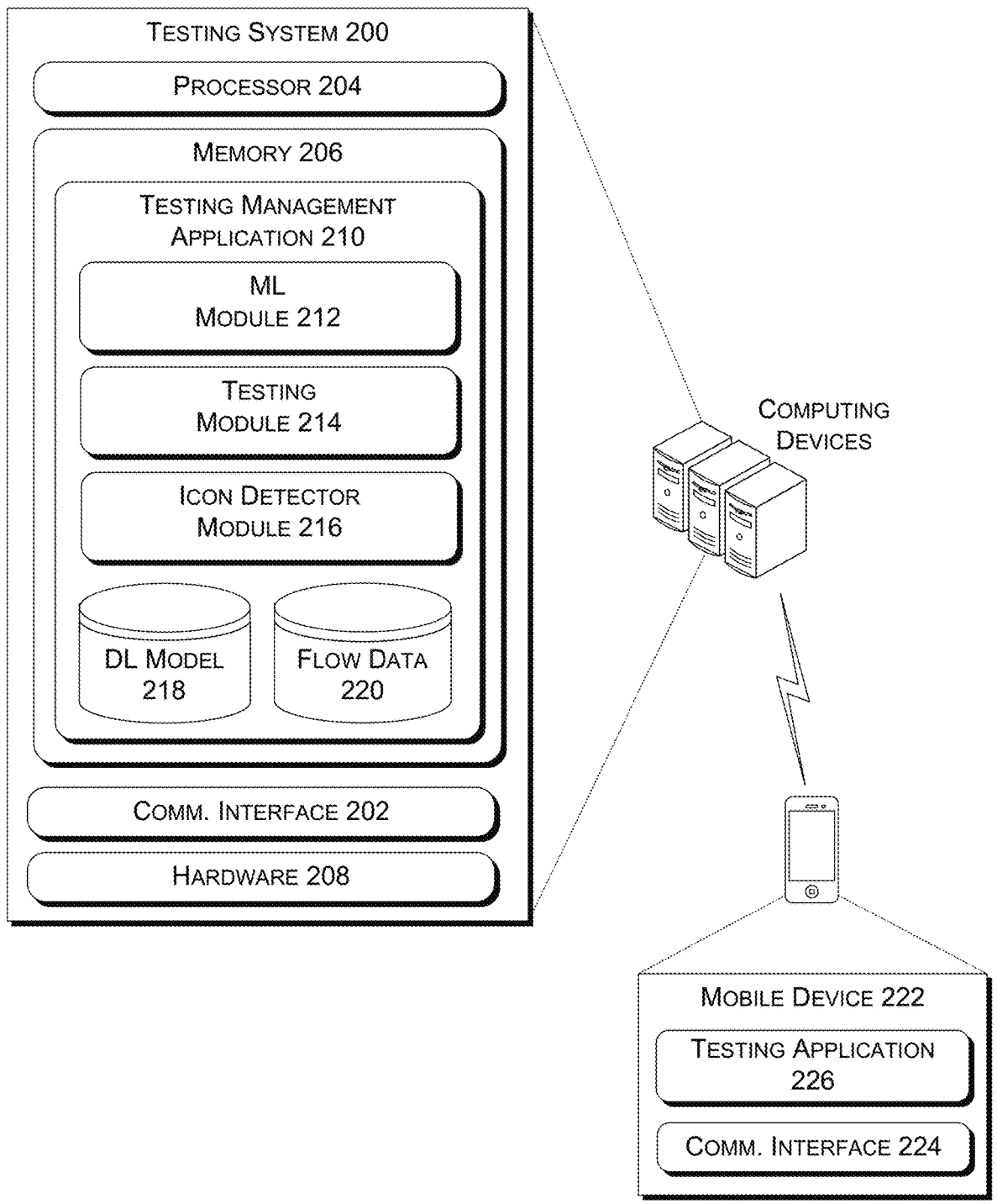
FIG. 2 is a block diagram showing various components of a first example of a computing system architecture that supports a testing platform for automating testing of a mobile device using visual analysis.

FIG. 2 is a block diagram showing various components of a first example of a computing system architecture that supports a testing platform for automating testing of a mobile device using visual analysis. The system architecture may include a testing system 200 that comprises one or more computing devices. The testing system 200 may include a communication interface 202, one or more processors 204, memory 206, and hardware 208. The communication interface 202 may include wireless and/or wired communication components that enable the testing system 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The testing system 200 can include any computing device configured to perform at least a portion of the operations described herein. The testing system 200 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The testing system 200 can include one or more virtual machines running virtual operating systems, or other computing architectures involving virtualization such as one or more flexible pools of logical storage devices that can be virtualized to maintain virtual storage devices for the computer. For example, the testing system 200 may include virtual computing devices in the form of virtual machines or software containers that are hosted in a cloud.

The memory 206 may be implemented using computer-readable media, such as computer storage media. Computer-readable media can include various types of computer-readable media, such as computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the testing system 200 may implement functionality from a testing management application 210 that includes one or more software modules and data stores. Such software modules may include routines, program instructions, objects, and/or data structures that are executed by the processors 204 to perform particular tasks or implement particular data types. The testing management application 210 may include a machine learning (ML) module 212 that generates correlations between visual elements and user actions, a testing module 214 that determines testing actions and executes those actions on a mobile device, and an icon detector module 216 that provides information on locations and categories of visual elements. The data stores may include a trained machine learning model 218 that has been trained on testing data with respect to a mobile device as well as flow data 220 that indicates steps to be taken during a testing routine.

The machine learning module 212 may be configured to, in conjunction with the processor 204, generate a learning model that is trained to correlate a screenshot image or particular portions of a screenshot image with a state within a testing routine. For example, the machine learning module 212 may comprise a neural network or other suitable machine learning algorithm that accepts screenshot images as input and user action data as outputs. Such a neural network may then determine correlations between the inputs and the outputs. In some embodiments, the machine learning module 212 may be configured to identify a current step associated with a testing flow associated with a testing routine based on the received snapshot. The machine learning module 212 may then determine a next user action based on the current step. For example, the machine learning module 212 may identify the next step in a testing routine based on a received screenshot. In some embodiments, the machine learning module 212 may be trained to identify a testing routine failure based on the snapshot. For example, a testing routine failure may be determined if a received snapshot does not match an expected snapshot.

The testing module 214 may be configured to, in conjunction with the processor 204, cause the testing system to run a testing routine on a mobile device without user interaction. To do this, the testing module 214 may cause a mobile device (e.g., via a testing application installed upon the mobile device) to capture a screenshot of what is currently being presented on a screen of the mobile device. The testing module 214 may receive the captured screenshot via a communication session. In some embodiments, the testing module 214 then provides the screenshot to the trained model to determine a next action to be performed. Additionally, the screenshot may be provided to the icon detector module 216 in order to determine locations and categories of icons displayed in the snapshot. The testing module 214 then generates a user action by identifying an icon associated with the next action as determined via the trained model and its corresponding location as determined by the icon detector module 216. The testing module 214 then provides the user action to the mobile device to be executed. The testing module 214 may continue to run the testing routine until a failure condition or success condition is determined.

The icon detector module 216 may be configured to, in conjunction with the processor 204, identify a number of icons within snapshot data. To do this, the icon detector module 216 receives a snapshot image as input and uses optical recognition techniques to identify and classify particular icons within the snapshot. In some embodiments, this may involve comparing a library of known icons to graphical representations detected within the snapshot. Icons may be classified based on their similarity to known icons. A set of coordinates are then determined for each icon within the snapshot, the coordinates representing a location of the icon within the snapshot. In some embodiments, coordinates for a particular icon may represent a point located at the center of that icon. The icon detector module 216 may then be configured to return a list of available icons by category along with the corresponding locations for those available icons.

As noted elsewhere, the testing system 200 may be in communication with a number of mobile devices 222. Such a mobile device 222 may be any electronic device capable of interacting with the testing system 200 as described herein. Examples of such mobile devices 222 are tester devices 104 and/or the test device 106 as described with respect to FIG. 1 above. The mobile device 222 may include a processor and a computer readable memory as well as a communication interface 224. The computer readable memory of the mobile device 222 may include a testing application 226 that enables interaction between the mobile device 222 and the testing system 200. In some embodiments, execution of the testing application 226 on the mobile device 222 may cause the mobile device 222 to instantiate a testing routine as described herein. In some embodiments, the testing application 226 may execute as a background program on the mobile device 222 that performs the testing routine.

The communication interface 224 may include wireless and/or wired communication components that enable the mobile devices to transmit or receive data via a network, such as the Internet. In some embodiments, the communication interface 224 may include both short-range and long-range communication mechanisms. In some embodiments, communications between mobile devices may be established via a short-range communication mechanism of the communication interface 224 whereas communications between a mobile device and the testing system 200 may be established via a long-range communication mechanism.

The testing application 226 may cause the mobile device 222 to interact with the testing system 200. For example, a communication session may be established between the testing system 200 and the mobile device 222 via the respective communication interfaces 202 and 224. In some embodiments, the testing application 226 may provide the mobile device 222 with access to functionality provided via one or more modules (e.g., the testing management application 210) implemented on the testing system 200, as well as provide the mobile device 222 with the abilities to send data to the one or more modules and receive instructions from the one or more modules. This may be done via the use of one or more application programming interfaces (APIs) associated with the testing system. For example, a testing application 226 on the mobile device may call such an API to access functionality provided by the testing system.

In some embodiments, the testing application 226 may receive instructions from the testing management application 210 in relation to actions to be performed on the mobile device and may execute those actions. For example, the testing application 226 may capture a screenshot image representative of images displayed on the screen of the mobile device by activating a built-in screen capture function of the mobile device operating system. The testing application 226 may then provide that screenshot to the testing system 200 via the established communication session. The testing application 226 may receive an indication of a user input to be executed and may cause the mobile device to execute that user input. For example, the mobile device may simulate a user's touch on the screen of the mobile device at a specified location. In some cases, the testing application does this by sending a set of screen coordinates (e.g., the location) and a touch input to an API of the operating system program module of the mobile device responsible for processing screen touch inputs.

Figure 3:
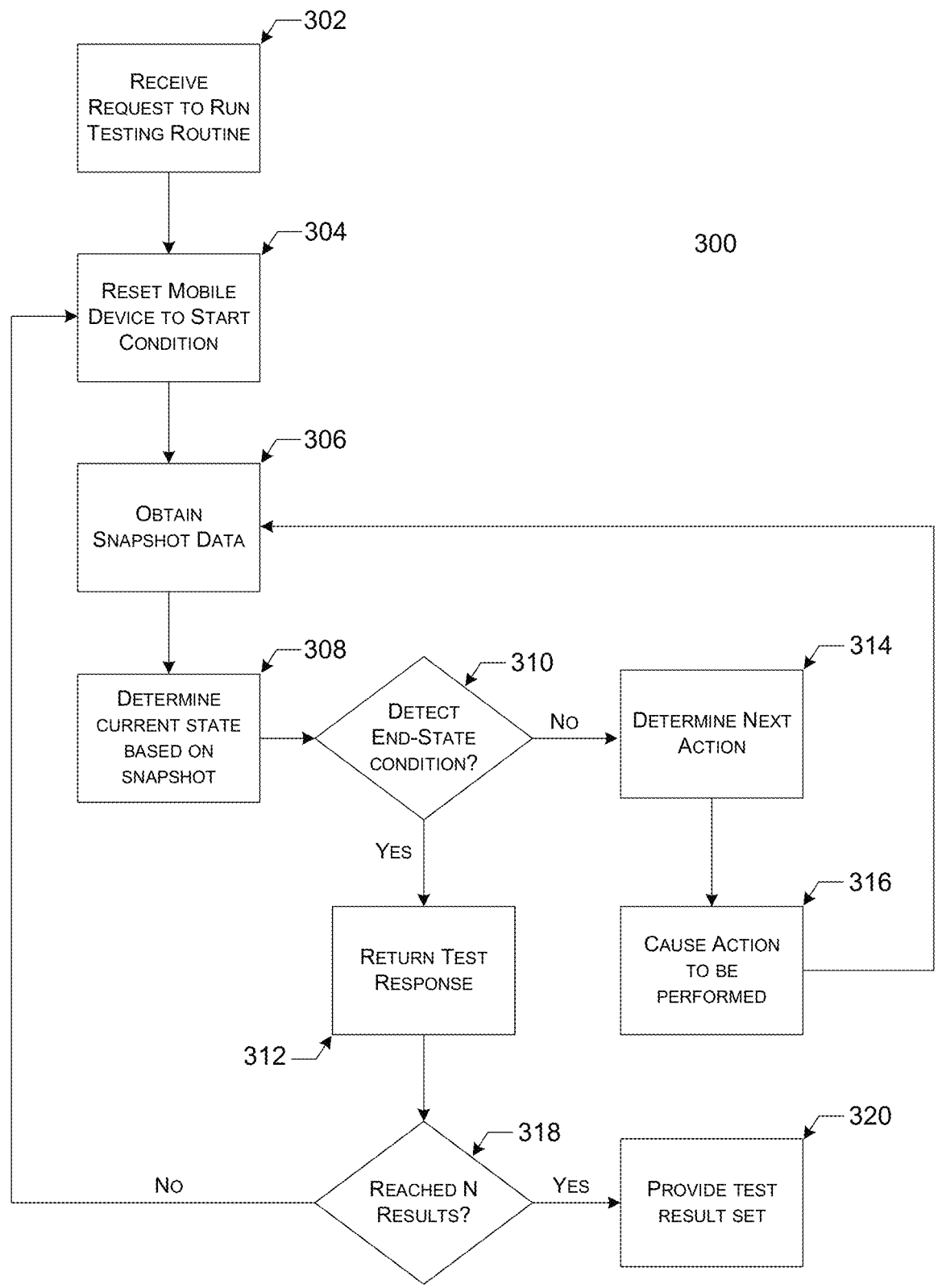
FIG. 3 depicts a flow diagram showing an example flow of a process for automating testing of a mobile device in accordance with embodiments.

FIG. 3 depicts a block diagram showing an example flow of a process 300 for automating testing of a mobile device in accordance with embodiments. The process 300 involves interactions between various components of the architecture 100 described with respect to FIG. 1. More particularly, the process 300 involves interactions between a testing platform 102, tester devices 104, and a test device 106.

At 302, the process 300 comprises receiving a request to run a testing routine. In some embodiments, the request may be associated with a particular type of mobile device and/or operating system. In some embodiments, the request may be associated with a particular testing routine related to an action (e.g., make a phone call, send a text message, access a website, etc.). At 304, the process comprises resetting the mobile device to a start condition for the testing routing, in response to receiving the request to run the testing routine.

At 306, the process 300 comprises obtaining snapshot data from the mobile device. In some embodiments, this involves capturing a visual element of what is currently displayed upon a screen of the mobile device. In some cases, this may involve an activation of a snapshot function on the mobile device. In other cases, this may involve using a camera to capture an image or video of the screen of the mobile device. In some embodiments, the testing routine is performed on the mobile device (e.g., via a testing application). In some embodiments, the snapshot data is transmitted to a testing system remote from the mobile device as described.

At 308, the process 300 comprises determining a current state of the testing routine based upon the obtained snapshot data. In some examples, the process may identify a snapshot image that is expected at a particular stage of the testing routine, and the process may then compare the obtained snapshot data to the expected snapshot to determine a degree of similarity. In other examples, a behavioral model can be configured to dynamically determine the current state of the testing routine based on the snapshot data, based on how the behavioral model was trained rather than based on a comparison with an expected snapshot associated with a predefined stage of a predefined testing flow. For instance, the behavioral model may dynamically determine the current state of the testing routine based on differences between the current snapshot and a preceding snapshot received from the mobile device, and/or based on evaluation of the current snapshot as discussed further below with respect to FIG. 8 and FIG. 9.

In some embodiments, one or more visual elements may be identified as being relevant to the testing routine. In some cases, a current state of the testing routine may be determined from the one or more visual elements. For example, a current step of the testing routine may be identified based on the determined one or more visual elements. In other words, a state of the testing routine may be determined based on what screen is being presented on the mobile device. In some examples, if a determined state does not match an expected state, then instructions may be provided to the mobile device to cancel or exit out of one or more applications and return to a home screen. In other examples, a behavioral model or other machine learning model can determine how to dismiss a pop-up or other unexpected message or element displayed in a snapshot, as discussed further below.

At 310, the process 300 comprises detecting whether the current condition represents an end-state condition. In some examples, an end-state condition may be any state that is indicative of either a testing routine success or a testing routine failure. In some embodiments, a success state condition may be associated with the inclusion of certain visual elements within the screenshot and/or a completion of some set of steps or actions. For example, a testing routine related to completing a call on a mobile device may be determined to be successful upon the display of a "call ended" screen on the mobile device. In some embodiments, a failure condition may be detected upon determining that the screenshot data does not match an expected screenshot data or based on a similarity between the obtained screenshot data and the expected screenshot data. For example, upon determining that the obtained screenshot data is lacking at least one expected visual element that is used to proceed with the testing routine, a failure condition may be detected. In other examples, the end-state condition can be an indication that the testing routine has completed, while a behavioral model or other machine learning model can be configured to manage or resolve failure conditions that might otherwise interrupt the testing process to fail.

Upon determining that the current state of the testing routine is an end-state ("Yes" from decision block 310), the process 300 may comprise returning a response at 312. In some embodiments, this may involve providing an indication of a failure or success to the testing system in relation to the testing routine.

Upon determining that the current state of the testing routine is not an end-state ("No" from decision block 310), the process 300 may comprise determining a next action at 314. In some embodiments, this may comprise identifying a user input associated with the determined current state. In some cases, the user input is associated with a particular visual element located within the screenshot data. In such cases, the user input may comprise a selection of an object at a location of the visual element within the screenshot as determined. For example, the determined action may be to simulate a user touch at the location of the visual element.

At 316, the process 300 comprises causing the determined action to be performed. In some examples, this involves providing instructions to the mobile device that cause it to perform the determined action. For example, the instructions may cause the mobile device to detect a user touch at a particular location on the screen even though no such user touch has been made. In other examples, the system can cause a robotic arm or other mechanism to physically touch a screen of the mobile device to simulate a user touch at the particular location. After causing the action to be performed at 316, the process can return to 306 to obtain additional snapshot data from the mobile device, for example showing a new state of the screen of the mobile device in response to the action performed at 316. It should be noted that the process 300 involves a loop that is exited upon detection of an end-state condition. Hence, in embodiments in which such a loop is implemented, the system need not know in advance the number of steps to be performed in a testing routine.

In some examples, if the end-state condition is detected at 310, a test response can be returned at 312 and it can be determined if N results have been reached in association with the test routine. If less than N results have been reached, for instance if less than a predetermined number of test results have been obtained in association with the test routine, the process can return to 304 to rest the mobile device to a start condition for a next iteration of the testing routine. However, if N results have been reached, the process 300 can provide a corresponding test result set at 320.

Figure 4:
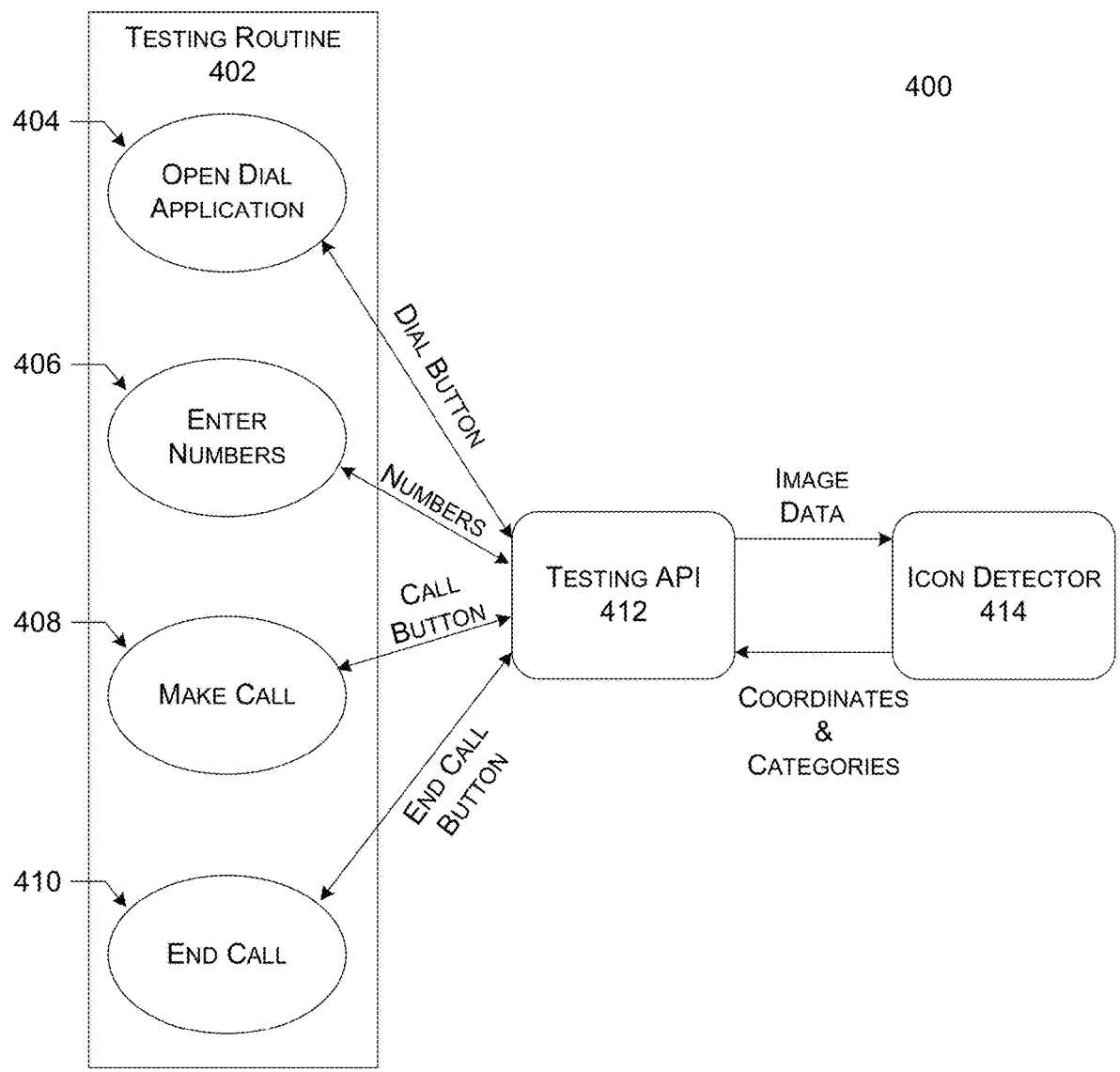
FIG. 4 depicts a block diagram illustrating an example of a process in which execution of a testing routine is automated.

FIG. 4 depicts a block diagram illustrating an example of a process 400 in which execution of a testing routine is automated. In some examples, the process 400 can be performed by the testing system 200 shown in FIG. 2. A testing routine 402 is depicted as a series of steps 404-410 to be executed during the testing routine. In some embodiments, the series of steps 404-410 of the testing routine may be determined from a testing flow maintained by a testing platform. In some embodiments, the series of steps 404-410 may be determined using one or more machine learning algorithms (e.g., ML module 212 of FIG. 2) based on interaction data received from a number of tester devices. A number of different testing routines may be executed each time that a software update is made to a mobile device to ensure that other services and functionality are not adversely affected by the software update. Each testing routine may be associated with a user goal that can be accomplished on the mobile device, such as making a phone call, etc.

The testing routine 402 may be executed automatically by accessing the functionality provided by a testing platform. In some embodiments, the functionality provided by the testing platform may be provided via a testing API 412 associated with the testing platform. For example, a mobile device may have installed upon it a testing application (e.g., testing application 226 of FIG. 2) that utilizes a testing API that enables interaction between the mobile device and the testing platform. The testing API may provide access to at least an icon detector module 414 implemented on the testing platform. Icon detector module 414 is an example of icon detector module 216 described with respect to FIG. 2.

In the process 400, each step of the testing routine 402 is performed automatically (e.g., without user interaction). By way of illustration, a testing application executed on the mobile device may, upon determining that the testing routine 402 is to be executed, initiate the step 404. To do this, image data (e.g., a snapshot) is provided to the icon detector module 414 which returns a category of each currently available icon as well as corresponding coordinates for each icon. The process 400 then determines which of the available icons is used for the current step based on the icon categories and generates a user input action at the coordinates associated with the corresponding icon. In some embodiments, if the corresponding icon is not among the available icons, then an action may be generated to change a current screen of the mobile device. In some embodiments, a failure condition may be detected if the corresponding icon is not among the available icons. In the depicted example, step 404 is associated with the selection of a "Dial Button" icon. Accordingly, to complete step 404, the icon associated with a dial button category is identified within the available icon data provided by the icon detector and a user selection is generated at a set of coordinates associated with that icon. These techniques are then repeated for each of steps 406, 408, and 410 to complete the testing routine 402.

Figure 5:
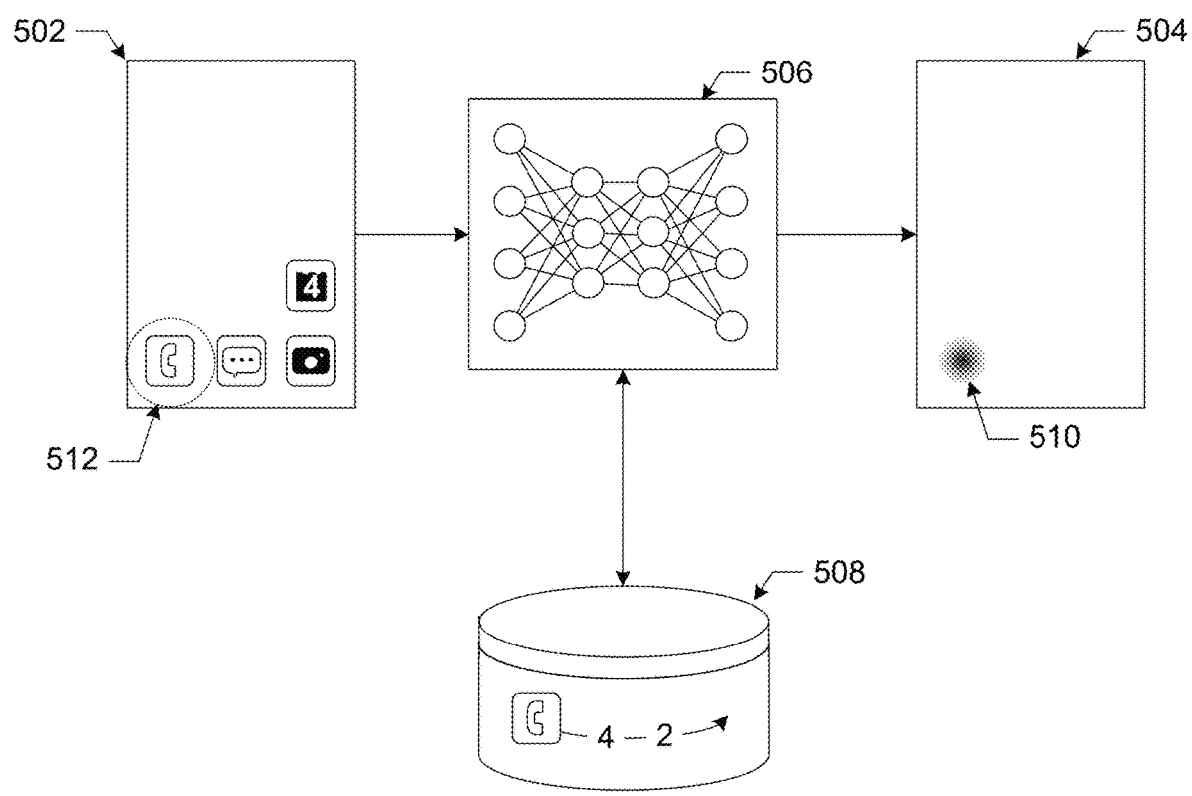
FIG. 5 depicts an example of a process by which a testing routine may be learned using visual analysis.

FIG. 5 depicts an example of a process by which a testing routine may be learned using visual analysis. In some embodiments, this may involve obtaining interaction data (e.g., interaction traces) from a number of mobile devices. In some cases, those mobile devices may be operated by testers or other agents of a testing system. In some cases, those mobile devices may be operated by users that are not affiliated with the testing system. For example, the testing system may receive interaction data from various users serviced by a wireless carrier network during the course of the user's typical use of his or her mobile device.

The interaction data may include an indication of actions conducted by a user 504 (e.g., locations of a touch selection) as well as screenshot images 502 captured by the mobile device at the time of those actions. In some embodiments, a set of interaction data received from a user may be associated with a user goal. For example, a series of actions performed by a user and the screenshots associated with that series of actions may be categorized as being associated with a user goal of making a phone call. In some embodiments, series of actions received from a number of users in relation to a common user goal may be aggregated. In some embodiments, such series of actions may be aggregated based on a type (e.g., model) of mobile device and/or operating system (or version) used by the user. For example, interaction data received from a number of different users that is related to a common goal for the different users may be aggregated or grouped based on a model and operating system for each of the different users. The aggregated interaction data is then provided to a machine learning algorithm 506 in order to draw correlations actions and visual elements (e.g., icons) in a trained learning model 508. In some examples, this may lead to separate trained learning models 508 generated for different combinations of mobile device type/operating system. However, in other examples a trained machine learning model 508 can be generated that is applicable to any type of mobile device or any type of operating system. For instance, as discussed further below, a behavioral model can be trained on training data showing screenshots and corresponding user inputs on one or more types of mobile devices or operating systems, such that the behavioral model can be trained to dynamically predict next actions to perform during testing routines on any type of mobile device or any type of operating system. In some embodiments, separate trained learning models 508 may be generated for different user goals.

Upon receiving an aggregated set of interaction data related to a particular user goal, a learning model may be trained to perform a testing routine associated with the performance of that user goal. This involves ordering each user interaction in the interaction data and associating it with a visual element. In some embodiments, outlier interactions may be removed from the aggregated set of interaction data. For example, extra user selections, or user selections for which coordinates are greater than some threshold distance from average coordinates for such a user selection, may be removed from the aggregated set of interaction data.

In some embodiments, available visual elements within snapshot data are categorized and located (e.g., via an icon detector module as described elsewhere). Coordinates of user selections 510 on the screen of the mobile device in the received interaction data are then compared to the coordinates of the identified visual elements in order to determine a most likely selected visual element 512 from those available. It should be noted that coordinates of user selections may vary across different users, such that an average of the coordinates of a user selection may be calculated from a distribution of such user selections (represented at 510 by a heat map).

In some embodiments, the process need not categorize visual elements within a screenshot. For example, the process may instead be trained to identify visual elements located in the screenshot at the coordinates of user selections 510 and simply associate those visual elements with the action.

In the manner described above, a trained learning model 508 may be trained to execute a testing routine based upon correlations between visual elements and user actions for each interaction of a series of interactions received from a set of users as well as an order in which those user actions should be performed. Once a trained learning model 508 has been trained to execute a testing routine in this manner, the execution of the testing routine may be automated.

To execute a testing routine, the trained learning model 508 is provided with a screenshot from a mobile device on which the testing routine is to be performed. In response to receiving the screenshot, the trained learning model 508 generates a user action to be performed based on visual elements identified within the screenshot as well as the order in which actions are to be performed. When the user action is performed on the mobile device, another screenshot is captured and provided to the trained learning model 508, which generates the next action in the testing routine. This is repeated until the testing routine is completed or a testing failure is detected.

Figure 6:
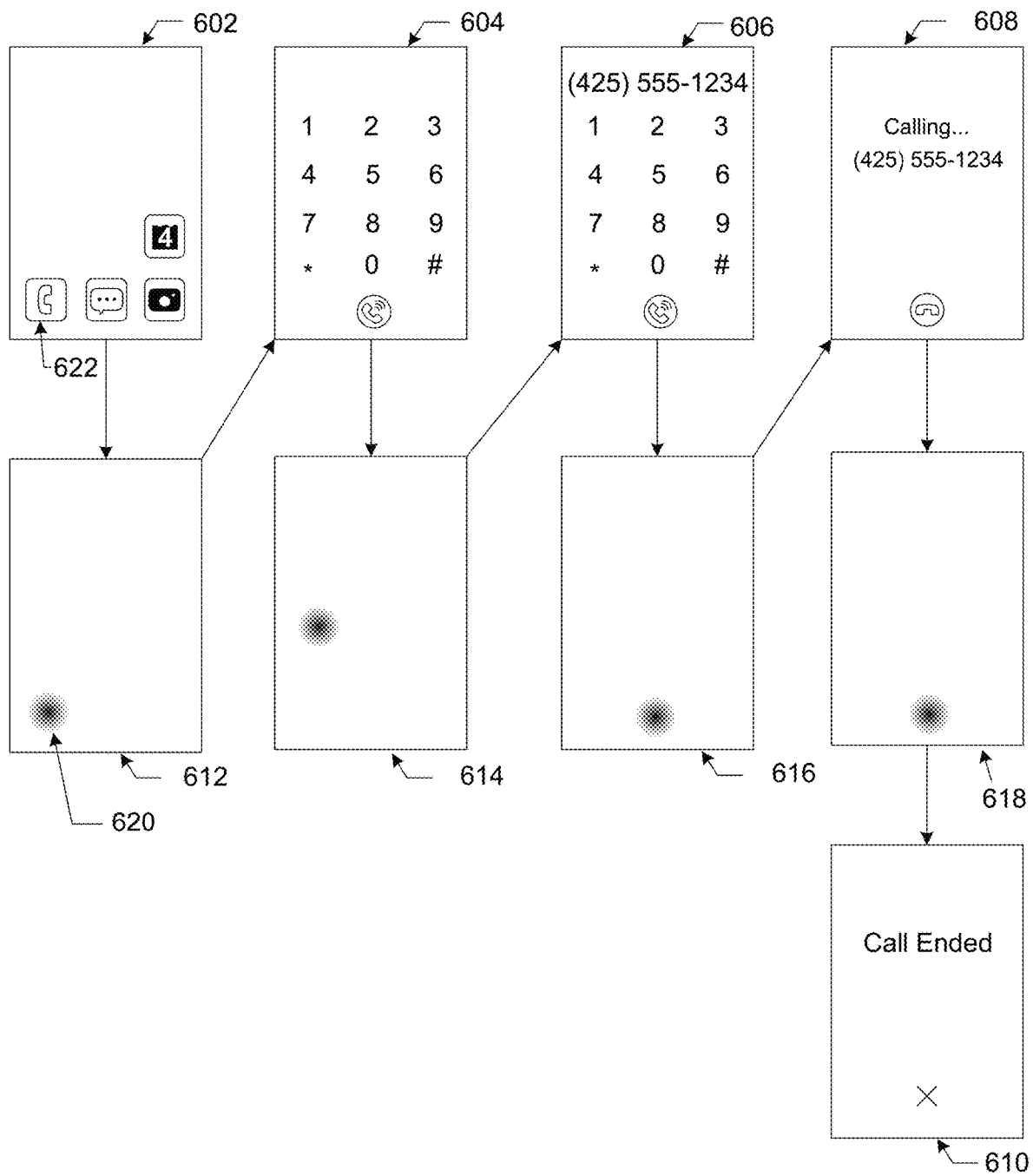
FIG. 6 depicts an example of a process in which a testing routine may be automated in accordance with at least some embodiments.

FIG. 6 depicts an example of a process 600 in which a testing routine may be automated in accordance with at least some embodiments. The process 600 is depicted as a series of screenshots 602-610 and corresponding simulated user inputs 612-618. A simulated user input comprises instructions that, when executed by a mobile device, simulate a user touch at a particular location of the screen of the user device (e.g., by calling an API of the mobile device's OS responsible for detecting touchscreen input).

In the process 600, a mobile device may provide a screenshot 602 to a learning model and may be provided with a corresponding simulated user input 612 (as described in greater detail with respect to FIG. 5 above). The user input may include an indication of a location 620 on a screen of the mobile device at which a visual element 622 is located. The simulated user input 612 may include instructions to select an object at the location 620 (e.g., via simulation of a user touch at the location).

In the process 600, an execution of the simulated user input 612 on a mobile device may cause the mobile device to update the image presented on the screen of the mobile device. A screenshot 604 may then be captured of the image presented on the screen. The process 600 may be repeated a number of times until an end-state of the testing routine is reached. In this scenario, a simulated user input 614 may be determined upon processing screenshot 604. Screenshot 606 is obtained upon execution of simulated user input 614, from which simulated user input 616 is generated. Screenshot 608 is obtained upon execution of simulated user input 616, from which simulated user input 618 is generated. In this scenario, screenshot 610 is obtained upon execution of simulated user input 618. The testing routine may be ended upon determining that the screenshot 610 represents an end-state for the testing routine. For example, the screenshot 610 may be determined to be associated with a test success condition.

Figure 7:
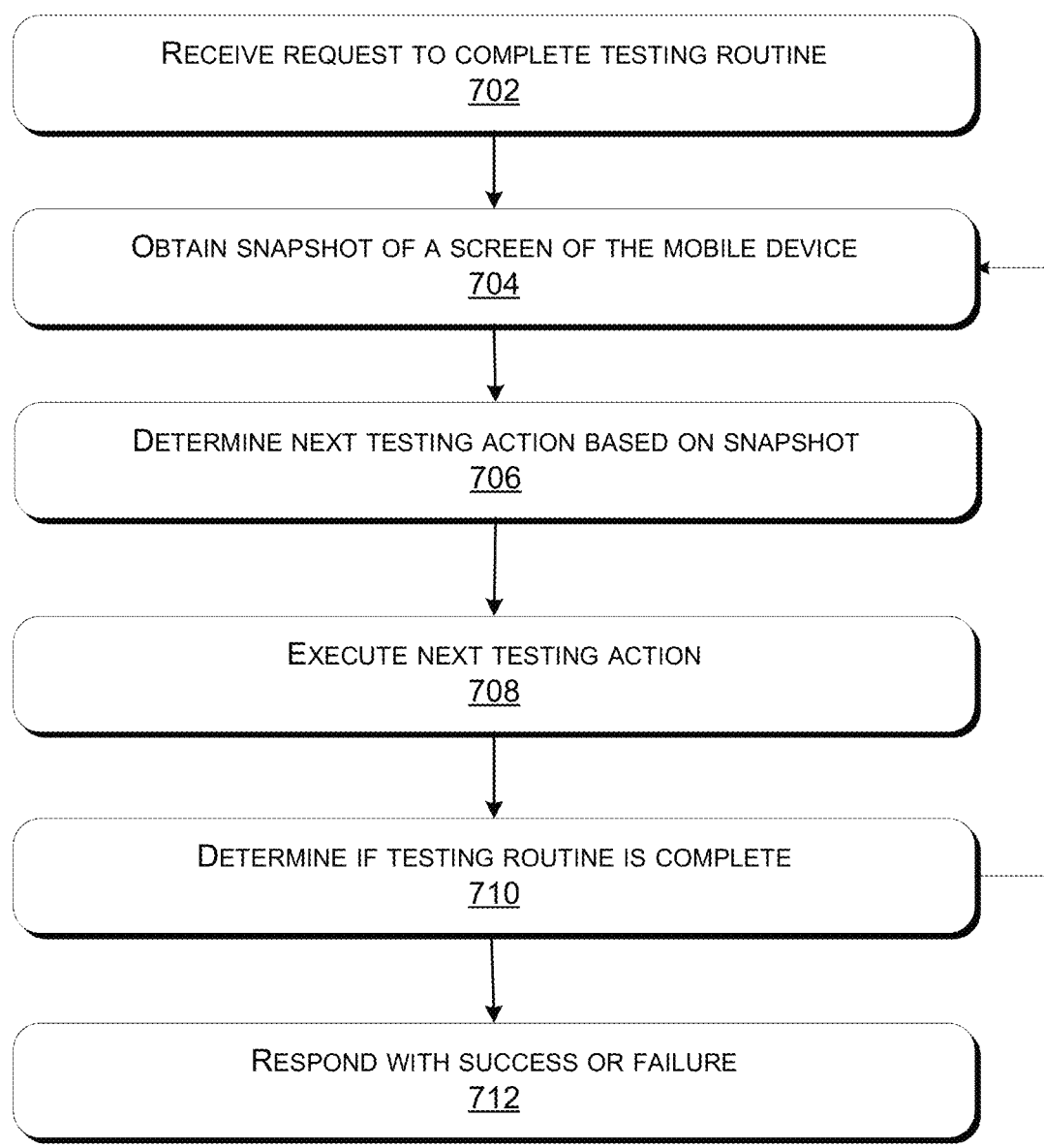
FIG. 7 depicts a flow diagram showing an example flow of a process for automating execution of a testing routine in accordance with some embodiments.

FIG. 7 depicts a block diagram showing an example flow of a process 700 for automating execution of a testing routine in accordance with some embodiments. In accordance with embodiments, the process 700 may be performed by components within a testing system 102 as discussed with respect to FIG. 1 above. In some embodiments, such a component comprises the mobile device and the instructions comprise a testing application. In some embodiments, such a component comprises a server on which a testing platform is implemented.

At 702, the process 700 comprises receiving a request to complete a testing routine. In some embodiments, the testing routine is associated with a user goal. For example, the testing routine may pertain to making a call, sending a text message, accessing a website, or any other suitable task. In some embodiments, the testing routine is associated with a type of mobile device or an operating system of the mobile device.

At 704, the process 700 comprises obtaining a snapshot of a screen of the mobile device. In some embodiments, the current snapshot of a screen of the mobile device comprises a number of icons displayed upon the screen of the mobile device. In these embodiments, the process may further comprise determining a category and coordinates for each of the number of icons displayed upon the screen of the mobile device (e.g., via an icon detector module).

At 706, the process 700 comprises determining a next testing action based on the obtained snapshot. In some embodiments, determining a next testing action for the mobile device based on the current snapshot comprises providing the current snapshot to a machine learning model that has been trained based on actions taken by a number of users. For example, determining a next testing action may comprise providing the current snapshot to a trained machine learning model and receiving, in response, a next testing action comprising an action commonly taken by a number of users when executing the user goal. In some cases, the next testing action for the mobile device is also determined based at least in part on a type of the mobile device or an operating system installed upon the mobile device. In some embodiments, a testing routine is associated with a type of the mobile device or an operating system of the mobile device. In these embodiments, the next testing action for the mobile device is also determined based on a type of the mobile device or an operating system of the mobile device.

At 708, the process 700 comprises executing the next testing action. In some embodiments, executing the next testing action comprises simulating a human touch at a specific location on the screen of the mobile device. In these embodiments, the specific location on the screen of the mobile device corresponds to a location of an icon identified within the current snapshot, wherein that icon is determined to be associated with the next testing action.

At 710, the process 700 comprises determining if the testing routine is complete. The testing routine is determined to be complete upon detecting that the testing routine has reached an end-state. For example, the testing routine is determined to be complete upon determining the that the execution of the testing routine is a success or a failure. In this example, the execution of the testing routine may be determined to be a failure upon determining that the current snapshot does not match an expected snapshot. Additionally, in this example, the execution of the testing routine may be determined to be a success upon determining that the current snapshot is associated with an end of the testing routine. At 712, the process 700 comprises responding to the request with an indication whether the execution of the testing routing is a success or a failure.

Figure 8:
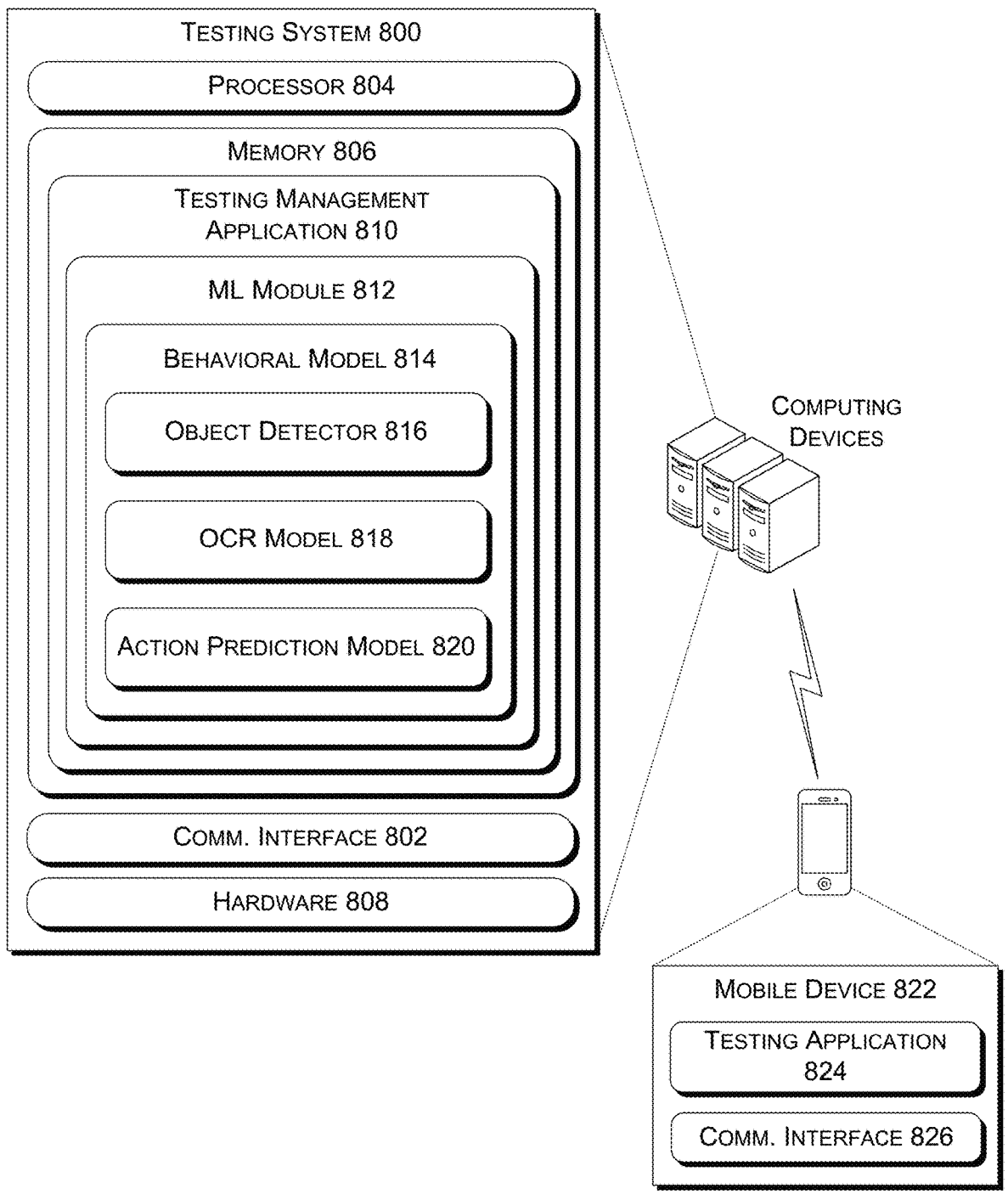
FIG. 8 is a block diagram showing various components of a second example of a computing system architecture that supports a testing platform for automating testing of a mobile device using visual analysis.

FIG. 8 is a block diagram showing various components of a second example of a computing system architecture that supports a testing platform for automating testing of a mobile device using visual analysis. The system architecture may include a testing system 800 that comprises one or more computing devices. The testing system 800 may include a communication interface 802, one or more processors 804, memory 806, and hardware 808. The communication interface 802 may include wireless and/or wired communication components that enable the testing system 800 to transmit data to and receive data from other networked devices. The hardware 808 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The testing system 800 can include any computing device configured to perform at least a portion of the operations described herein. The testing system 800 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The testing system 800 can include one or more virtual machines running virtual operating systems, or other computing architectures involving virtualization such as one or more flexible pools of logical storage devices that can be virtualized to maintain virtual storage devices for the computer. For example, the testing system 800 may include virtual computing devices in the form of virtual machines or software containers that are hosted in a cloud.

The memory 806 may be implemented using computer-readable media, such as computer storage media. Computer-readable media can include various types of computer-readable media, such as computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 804 and the memory 806 of the testing system 800 may implement functionality from a testing management application 810 that includes one or more software modules and data stores. Such software modules may include routines, program instructions, objects, and/or data structures that are executed by the processors 804 to perform particular tasks or implement particular data types.

The testing management application 810 can have an ML module 812 that includes or is associated with a behavioral model 814. The behavioral model 814 can be a machine learning model, such as a deep learning model or other type of machine learning model. The behavioral model 814 can include and/or be associated with an object detector 816, an optical character recognition (OCR) model 818, and/or an action prediction model 820. The object detector 816 can be configured to detect and locate objects, such as icons and/or other user interface elements, shown in a screenshot. The OCR model 818 can be configured to recognize characters, words, and/or other textual elements in a screenshot. The action prediction model 820 can be configured to determine a user action, such as a selection of an icon or other user interface element, to simulate based on a screenshot. The behavioral model 814 can accordingly process a screenshot of a test device by dynamically invoking one or more of the object detector 816, the OCR model 818, or the action prediction model 820, as discussed further below.

The ML module 812 can be configured to use training data to generate and/or train the behavioral model 814. In some examples, the ML module 812 can be an element of the testing management application 810. In other examples, the ML module 812 can be a separate element configured to generate and/or train the behavioral model 814 of the testing management application 810. Accordingly, in some of these examples, the behavioral model 814 can be a component of the testing management application 810 that can execute separately from, and/or independently from, the ML module 812 after the ML module 812 has trained the behavioral model 814.

The ML module 812 can comprise a deep learning model, such as a neural network, or other machine learning algorithm that receives training data including screenshot images and corresponding user action data. Such a neural network or machine learning algorithm may then determine correlations between the screenshot images and the user action data, to generate and/or train the behavioral model 814 to predict the user action data based on the screenshot images.

As an example, a set of data collected from tester devices 104 operated by testers during performance of a task, such as making a call or sending a text message, can be provided to the ML module 812. The set of data can include screenshots as well as coordinates indicating screen locations the testers selected in association with the screenshots. The ML module 812 can divide the set of data into a training set and a validation set. The ML module 812 can be configured to train the behavioral model 814 to predict, based on the screenshots in the training set, the corresponding coordinates of user selections indicated in the training set.

In some examples, the ML module 812 can accordingly train the behavioral model 814 to predict which of the object detector 816, the OCR model 818, and/or the action prediction model 820 to invoke while processing different types of screenshots. For example, the ML module 812 can train the behavioral model 814 to determine that, to accurately predict the corresponding coordinates of a user selection indicated in the training set from a given screenshot, the behavioral model 814 should invoke one or more of the object detector 816, the OCR model 818, or the action prediction model 820 to predict a user action corresponding with the user selection indicated in the training set.

The ML module 812 can also validate the behavioral model 814 by providing additional screenshots from the validation set to the behavioral model 814, and determining whether the trained behavioral model 814 accurately predicts the coordinates of user selections indicated in the validation set. If the trained behavioral model 814 predicts the coordinates of user selections indicated in the validation set to at least a threshold degree of accuracy, the behavioral model 814 can be deployed in the testing management application 810 to predict user selections to be performed during testing routines on test devices.

The testing management application 810 can accordingly be configured to, in conjunction with the processor 804, cause the testing system 800 to run a testing routine on a test device, such as the mobile device 822 shown in FIG. 8, without user interaction. In some examples, the testing management application 810 can cause the mobile device 822 (e.g., via a testing application 824 installed upon the mobile device 822) to capture a screenshot of what is currently being presented on a screen of the mobile device 822. The testing management application 810 can receive the captured screenshot via a communication session, for instance via a connection between the communication interface 802 of the testing system 800 and a communication interface 826 of the mobile device 822. In other examples, the testing management application 810 can receive a screenshot image of the mobile device 822 captured by a camera oriented toward the screen of the mobile device 822.

The testing management application 810 can provide the screenshot to the behavioral model 814. As discussed above, the behavioral model 814 can have, or be associated with, multiple components or models, such as the object detector 816, the OCR model 818, and/or the action prediction model 820. In these examples, the behavioral model 814 can be configured to select between use of the object detector 816, the OCR model 818, and the action prediction model 820 depending on a current scenario or state of a testing routine. For instance, the behavioral model 814 can invoke the object detector 816 to determine boundaries and/or locations of objects, such as icons or other user interface elements, displayed in the screenshot. The behavioral model 186 may also, or alternately invoke the OCR model 818 to identify text or other characters displayed in the screenshot. The behavioral model 814 can also, or alternately, invoke the action prediction model 820 to dynamically predict, based on the screenshot, a next action to be performed during the testing routine. For example, based on a screenshot showing a current state of the screen of the mobile device 822, the action prediction model 820 can predict which user interface element shown in the screenshot should be selected next during the testing routine by a simulated user action. The testing management application 810 can accordingly instruct the testing application 824 on the mobile device 822, or a robotic arm or other testing system, to implement the simulated user action on the mobile device 822.

The behavioral model 814 may invoke different ones of the object detector 816, the OCR model 818, or the action prediction model 820, depending on a current state of a testing situation indicated by a received screenshot. As an example, if the behavioral model 814 receives a screenshot showing a home screen, the behavioral model 814 may determine to invoke the action prediction model 820, such that the action prediction model 820 can predict a location on the home screen that should be selected to initiate a particular testing routine. In this example, the behavioral model 814 may determine to invoke the action prediction model 820, without invoking either the object detector 816 or the OCR model 818, because the action prediction model 820 has been trained to directly predict which icons, and/or icon locations, on home screens can be selected to initiate the particular testing routine. For instance, the action prediction model 820 can have been trained on training data indicating call icons that testers selected on home screens to begin making calls. Accordingly, by being trained on such training data, the action prediction model 820 can determine the location of a call icon on the home screen shown in the new screenshot, even if the call icon looks different and/or is located in a different position than similar call icons indicated in the training data.

As another example, a screenshot received by the behavioral model 814 may show a keyboard area. In this example, specific characters associated with discrete keyboard keys may not yet have been determined. Accordingly, the behavioral model 814 can invoke the OCR model 818 to identify the specific characters associated with the discrete keyboard keys. The behavioral model 814 may also invoke the object detector 816 to detect other objects shown in the screenshot, such as areas or fields that display phone numbers, previously-entered text, and/or other data. In some situations, the behavioral model 814 may also invoke the action prediction model 820 to determine which of the discrete keyboard keys, if any, should be selected during a next action in a testing routine. However, if the behavioral model 814 receives a screenshot showing a keyboard area and discrete keyboard keys for which corresponding characters have already been determined by the object detector 816 and/or the OCR model 818 based on a previous screenshot, or if the behavioral model 814 receives a screenshot that does not have objects and/or text to be recognized, the behavioral model 814 can skip invoking the object detector 816 and/or OCR model 818 and proceed with invoking the action prediction model 820 to determine a next action for the testing routine.

The object detector 816 can be a machine learning model, such as a deep learning model, or other type of model that is configured to evaluate a screenshot of a test device to detect and locate objects, such as icons and/or other user interface elements, shown in the screenshot. For example, the object detector 816 can be configured to detect a keyboard area corresponding to a keyboard displayed in the screenshot, detect discrete keys of the keyboard displayed in the screenshot, detect user-selectable buttons and/or application icons, detect signal strength bars, detect network indicators, and/or detect other user interface elements. The object detector 816 can be configured to identify boundaries and/or locations of discrete icons and/or other user interface elements. For example, the object detector 816 can be configured to determine coordinates of the edges and/or center of a detected icon, button, or other object shown in a screenshot.

Although in some examples the object detector 816 of the testing management application 810 can be similar to the icon detector module 216 of the testing management application 210 discussed above with respect to FIG. 2, the object detector 816 may be configured to detect locations and boundaries of icons or other user interface elements, but allow other elements of the behavioral model 814 to determine the meaning of those icons or user interface elements. For example, the object detector 816 can detect a boundary and position of a keyboard button shown in a screenshot, such that the OCR model 818 can use the boundary and position of the keyboard button to identify a letter, number, or character shown on the keyboard button, and/or such that the action prediction model 820 can determine whether the keyboard button is to be selected during a testing action.

The OCR model 818 can be a machine learning model, such as a deep learning model, or other type of model that is configured to recognize characters, words, and/or other textual elements. In examples in which the OCR model 818 is a machine learning model, the OCR model 818 can have been trained by the ML module 812 or other machine learning algorithm based on a set of training data that includes text and/or characters of multiple fonts, font sizes, font styles, and/or or other variable design attributes. As an example, the machine learning OCR model 818 can have been trained on text styles displayed within multiple types of operating systems, and/or other examples of text. By being trained on multiple types of text styles, the OCR model 818 can be configured to predict characters rendered in text styles the OCR model 818 was trained on, as well as text styles the OCR model 818 was not trained on. Accordingly, the machine learning OCR model 818 can be configured to recognize characters in screenshots of substantially any mobile device type or operating system type, including new device models or operating system versions that use fonts or text styles that the OCR model 818 was not trained on.

Although in some examples, the OCR model 818 can be a machine learning model, in other examples the OCR model 818 can be any other type of OCR model. In some examples, the OCR model 818 may be a component of the object detector 816 instead of a separate element of the behavioral model 814. For example, the object detector 816 may be configured to detect objects, and use the OCR model 818 to recognize and/or interpret any text associated with detected objects.

In some examples, the object detector 816 may be configured to identify and/or locate objects that have display relatively large numbers, letters, or other characters, while the OCR model 818 can be configured to identify or locate smaller numbers, letters, characters, and/or text. For example, the object detector 816 may be configured to directly identify relatively large numbers displayed on a telephone call dialing screen. In this example, the behavioral model 814 may determine not use the OCR model 818 to identify the numbers on the screenshot of the dialing screen, as the numbers may be large enough to be identified as distinct objects by the object detector 816. However, if a screenshot shows a keyboard with relatively small individual letters or characters, the behavioral model 814 may invoke the object detector 816 to identify the boundaries of the overall keyboard area, but invoke the OCR model 818 to identify and/or locate each individual key in the keyboard area that displays a distinct character or set of characters. As another example, if a screenshot shows a pop-up message or other user interface element that displays text, the behavioral model 814 may invoke the object detector 816 to identify the location and/or boundaries of the user interface element, and also invoke the OCR model 818 to recognize text displayed in the user interface element.

The action prediction model 820 can be trained to dynamically predict, based on a screenshot of a test device, a next action to perform during a testing routine on the test device. The action prediction model 820 can be a machine learning model, such as a deep learning model, trained on training data captured when human operators performed actions to make a call, send a text message, or other target activity associated with the testing routine. The training data may have indicated locations of user touches or selections at various stages of the target activity, in conjunction with captured screenshots. In some examples, the human operators may have been following a predetermined series of steps during the target activity. In other examples, the human operators may have been using their own experiences with similar devices to navigate user interfaces and perform the target activity. The training data may have been captured on a variety of types of devices, user interfaces, and/or operating systems, such that the training data indicates how users navigated varying types of user interfaces to perform the target activity. Accordingly, the action prediction model 820 can be trained to dynamically predict actions that users would likely perform to accomplish the target activity associated with a testing routine.

As an example, if a screenshot shows a home screen of the test device, and the testing routine is associated with making a call, the action prediction model 820 can predict that a phone icon on the home screen should be selected. Depending on a type or configuration of the particular test device, or an operating system or other software executing on the test device, selection of the phone icon on the home screen may bring up a dialing screen, a recent calls screen, a list of contacts, or another screen or view associated with a telephone application on the testing device. A subsequent screenshot can indicate which screen or view was presented on the test device in response to selection of the phone icon, such that the action prediction model 820 can dynamically determine which action to perform next to continue the process of making a call.

For instance, if selection of the phone icon on the home screen caused the test device to load a dialing screen of a telephone application, the object detector 816 can recognize buttons on the dialing screen, the OCR model 818 can determine specific numbers or other characters associated with each button, and/or the action prediction model 820 can determine locations of specific buttons that should be selected with simulated user touches to enter individual numbers of a telephone number. However, if selection of the phone icon on the home screen caused the test device to load a recent contacts screen of the telephone application, instead of a dialing screen, the object detector 816, the OCR model 818, and/or the action prediction model 820 can identify an icon, text link, or other user interface element on the recent contacts screen that may cause the telephone application to switch from presenting the recent contacts screen to a dialing screen. The testing management application 810 can accordingly cause the testing system 800 to select that user interface element, and the behavioral model 814 can verify from a subsequent screenshot that selection of the user interface element caused the telephone application to display the dialing screen where numbers of a telephone number can be selected.

Overall, the behavioral model 814 of the testing management application 810 can invoke the object detector 816, the OCR model 818, and/or the action prediction model 820 to dynamically predict next actions to perform during testing routines performed on test devices with substantially any user interface, operating system, or software. For example, although different test devices may have different user interfaces, different software, different operating systems, and/or other differences that may make preparing static or predefined testing routine flows for each potential difference difficult and/or time consuming, the behavioral model 814 of the testing management application 810 can be trained to recognize text and/or other user interface elements that may or may not have been reflected in training data, and to determine corresponding next actions that the action prediction model 820 predicts are likely to progress a testing routine.

In some examples, the OCR model 818 can also have a natural language processing (NLP) component, or the testing management application 810 can have a separate NLP component associated with the OCR model 818 and/or the action prediction model 820. In these examples, the NLP component can be configured to interpret text, associated with objects detected by the object detector 816, recognized by the OCR model 818. For example, if a screenshot shows a pop-up message, warning message, or other object with text that is unrelated to a current testing routine, the OCR model 818 can recognize the text and the NLP component can determine the meaning of the text. This can allow the action prediction model 820 to dynamically determine how to respond to the pop-up message, warning message, or other unexpected object, in order to continue the testing routine.

As a non-limiting example, if the mobile device 822 device receives an emergency alert during a testing routine, the mobile device 822 may display the emergency alert via a pop-up window. The pop-up window might otherwise interrupt the testing routine, or cause the testing routine to fail, because the pop-up window blocks or overlays user interface elements associated with a next action to be performed during the testing routine. However, the object detector 816 can detect the pop-up window, and the OCR model 818 can identify text of a "dismiss" button associated with the pop-up window. The NLP component can determine the meaning of the identified "dismiss" term, such that the action prediction model 820 can determine that the "dismiss" button should be selected in order to clear the pop-up window and allow the testing routine to continue.

The testing system 800 may be in communication with one or more mobile devices 822. Such a mobile device 822 may be any electronic device capable of interacting with the testing system 800 as described herein. Examples of such mobile devices 822 are tester devices 104 and/or the test device 106 as described with respect to FIG. 1 above.

Additionally, as discussed above, the mobile devices 822 may include mobile devices that have the same or different user interface elements, operating systems, or other software. For instance, the mobile devices 822 can include devices produced by different manufacturers, different models or generations of devices, devices that connect to different types of networks, or have other differences. As a non-limiting example, some mobile devices 822 can support both fifth generation (5G) and fourth generation (4G) wireless communication networks, while other mobile devices 822 may support 4G wireless communication networks, but not support 5G wireless communication networks. The testing management application 810 may be configured to perform similar testing routines on varying types of mobile devices 822. As an example, the testing system 800 can perform testing routines to determine call success metrics of 5G mobile devices relative to 4G mobile devices. As discussed above, different devices may have different user interfaces or other configurations, but the action prediction model 820 and/or other elements of the testing system 800 can be configured to dynamically determine actions for such testing routines on different types of devices.

A mobile device 822 may include a processor and a computer readable memory as well as a communication interface 826. The computer readable memory of the mobile device 822 may include the testing application 824 discussed above, which may enable interaction between the mobile device 822 and the testing system 800. In some embodiments, execution of the testing application 824 on the mobile device 822 may cause the mobile device 822 to instantiate a testing routine as described herein. In some embodiments, the testing application 824 may execute as a background program on the mobile device 822 that performs the testing routine.

The communication interface 826 may include wireless and/or wired communication components that enable the mobile device 822 to transmit or receive data via a network, such as the Internet. In some embodiments, the communication interface 826 may include both short-range and long-range communication mechanisms. In some embodiments, communications between mobile devices 822 may be established via a short-range communication mechanism of the communication interface 826 whereas communications between a mobile device and the testing system 800 may be established via a long-range communication mechanism.

The testing application 824 may cause the mobile device 822 to interact with the testing system 800. For example, a communication session may be established between the testing system 800 and the mobile device 822 via the respective communication interfaces 802 and 826. In some embodiments, the testing application 824 may provide the mobile device 822 with access to functionality provided via one or more modules (e.g., the testing management application 810) implemented on the testing system 800, as well as provide the mobile device 822 with the abilities to send data to the one or more modules and receive instructions from the one or more modules. This may be done via the use of one or more application programming interfaces (APIs) associated with the testing system 800. For example, a testing application 824 on the mobile device may call such an API to access functionality provided by the testing system 800. In some embodiments, the testing application 824 may receive instructions from the testing management application 810 in relation to actions to be performed on the mobile device and may execute those actions. For example, the testing application 824 may capture a screenshot image representative of images displayed on the screen of the mobile device by activating a built-in screen capture function of the mobile device operating system. The testing application 824 may then provide that screenshot to the testing system 800 via the established communication session. The testing application 824 may receive an indication of a user input to be executed and may cause the mobile device to execute that user input. For example, the mobile device may simulate a user's touch on the screen of the mobile device at a specified location. In some cases, the testing application does this by sending a set of screen coordinates (e.g., the location) and a touch input to an API of the operating system program module of the mobile device responsible for processing screen touch inputs.

Figure 9:
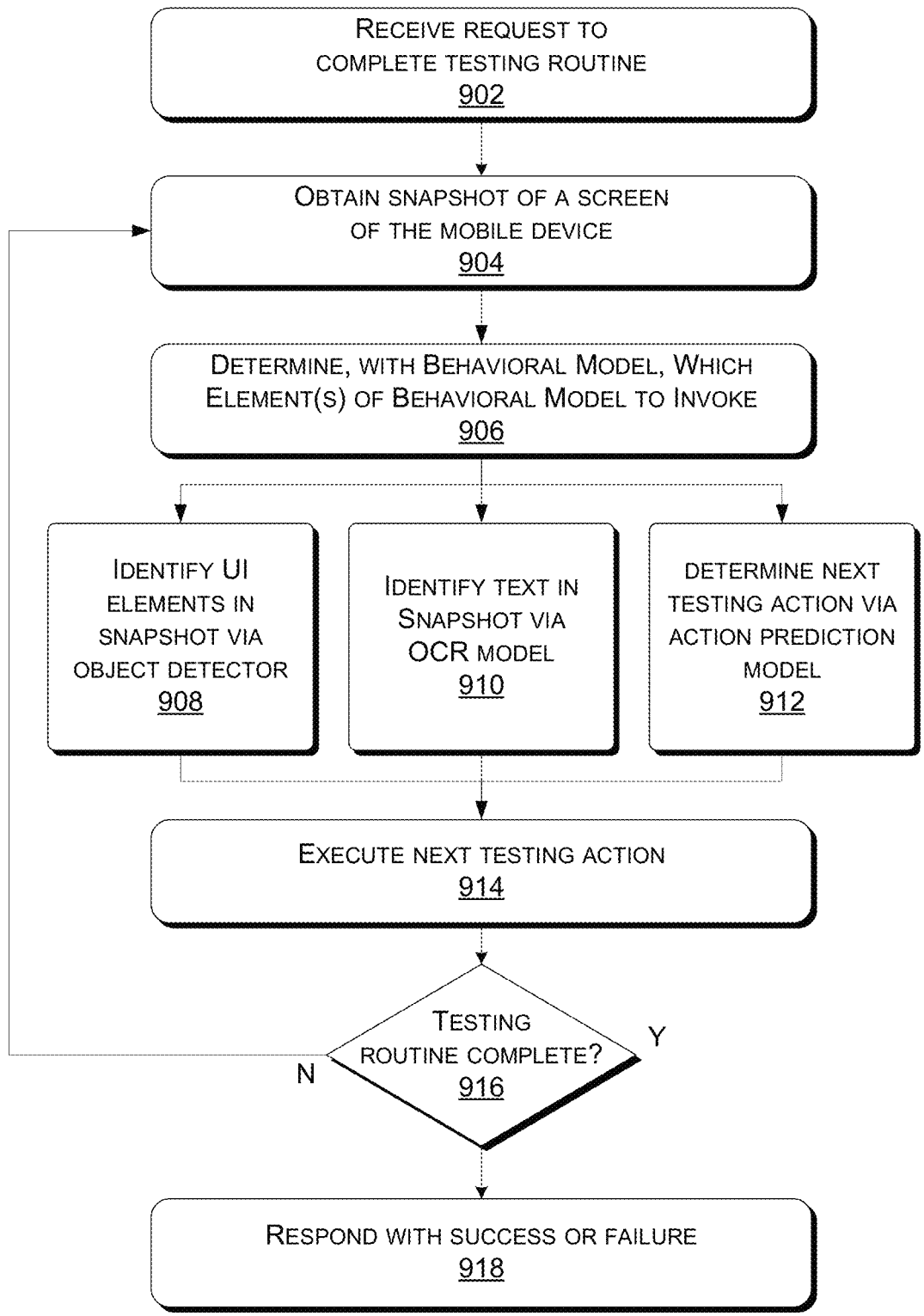
FIG. 9 depicts a block diagram showing an example flow of a process for automating execution of a testing routine in accordance with some embodiments.

FIG. 9 depicts a block diagram showing an example flow of a process 900 for automating execution of a testing routine in accordance with some embodiments. In some examples, the process 900 can be executed by elements of the testing management application 810 of the testing system 800 shown in FIG. 8, such as the behavioral model 814.

At 902, the process 900 comprises receiving a request to complete a testing routine. In some embodiments, the testing routine is associated with a user goal. For example, the testing routine may pertain to making a call, sending a text message, accessing a website, or any other suitable task.

At 904, the process 900 comprises obtaining a snapshot of a screen of the mobile device. The snapshot of the screen of the mobile device can include one or more icons, objects, or other user interface elements displayed upon the screen of the mobile device. In some examples, the snapshot can be a screenshot captured on the mobile device. In other examples, the snapshot can be captured via a camera oriented toward a screen of the mobile device.

At 906, the process comprises determining, by the behavioral model 814 of the testing management application 810, which elements of the behavioral model 814 to invoke to evaluate the snapshot. As discussed above, the behavioral model 814 can be a machine learning model trained to identify situations in which the object detector 816 should be used to identify objects in a snapshot, the OCR model 818 should be used to identify text shown in a snapshot, and/or the action prediction model 820 should be used to predict, based on a snapshot, a next action to perform to advance toward the user goal associated with the testing routine. Accordingly, the behavioral model 814 can be trained to determine whether to invoke the object detector 816, the OCR model 818, and/or the action prediction model 820 to process the snapshot, for instance to determine a current state of the testing routine shown in the snapshot and/or to dynamically determine a next action to perform based on the current state of the testing routine.

For example, if boundaries and/or coordinates of icons, objects, or other user interface elements shown in the snapshot received at have not already been identified by the object detector 816, for instance based on a similar previous snapshot, the behavioral model 814 can determine at 906 to invoke the object detector 816. The object detector 816 can accordingly identify the boundaries and/or coordinates of user interface elements or other objects at 908.

As another example, if text shown in the snapshot, such as text associated with user interface elements identified by the object detector 816 at 908 and/or other text shown in the snapshot, has not already been recognized, the behavioral model 814 can determine at 906 to invoke the OCR model 818. The OCR model 818 can accordingly identify the text in the snapshot at 910. In some examples, locations of text and/or individual characters by the OCR model 818 can be used instead as locations of corresponding objects, instead of or in addition to object locations that can be provided by the object detector 816.

As yet another example, the behavioral model 814 can determine at 906 to invoke the action prediction model 820 to dynamically determine a next testing action to perform based on the state of the snapshot obtained at 904. The action prediction model 820 can accordingly use the snapshot to determine which testing action should be performed next in the testing routine. For instance, the action prediction model 820 may identify an icon, button, or other user interface element shown in the snapshot that should be selected to advance the testing routine and lead towards achievement of the user goal. As discussed above, the action prediction model 820 can have been trained, based on training data indicating actions taken by users to manually achieve the user goal associated with the testing routine, to dynamically predict a next testing action that is likely to progress towards achieving the user goal.

In some examples, the behavioral model 814 may determine at 906 to invoke one of the object detector 816, the OCR model 818, or the action prediction model 820. As a non-limiting example, if the snapshot shows user interface elements that the action prediction model 820 has been trained to recognize and/or select from, the behavioral model 814 may determine not to invoke the object detector 816 or the OCR model 818, and may instead invoke the action prediction model 820 alone.

However, in other examples, the behavioral model 814 may determine at 906 to invoke two or more of the object detector 816, the OCR model 818, or the action prediction model 820. As a non-limiting example, if the screenshot shows a keyboard and a text entry field, the behavioral model 814 may determine to invoke the object detector 816 to recognize the location and boundaries of the text entry field, and also invoke the OCR model 818 to identify the individual letter keys of the keyboard. In some examples, the behavioral model 814 may additionally invoke the action prediction model 820 to determine one or more letter keys to select, and/or to identify a separate "enter" or "send" icon that should be selected after identified letter keys have been selected.

At 914, the process 900 comprises executing a next testing action. For example, the next testing action may be select one or more objects or other user interface elements, based on information determined by the object detector 816, the OCR model 818, and/or the action prediction model 820. For instance, if the current state of the testing routine shown in the screenshot received at 902 is entry of a predetermined phone number into a dialing screen, and the object detector 816 was invoked at 908 to identify and/or located numbers of the dialing screen, the next action executed at 914 can be to select one of the identified numbers, or a sequence of the identified numbers, on the dialing screen. However, if the screenshot indicates that the predetermined phone number has already been entered based on previous testing actions, or the next action involves entering and dialing the predetermined phone number, the next action executed at 914 may include selecting a dial button based on a prediction by the action prediction model 820. Further examples of testing actions are discussed below with respect to FIGS. 10-12.

In some embodiments, executing the next testing action at 914 comprises simulating a human touch at a specific location, or at a series of specific locations, on the screen of the mobile device. In these embodiments, a specific location on the screen of the mobile device can correspond to a location of an icon, object, or other user interface element identified within the current snapshot, wherein that user interface element is determined to be associated with the next testing action.

At 916, the process 900 comprises determining if the testing routine is complete. The testing routine is determined to be complete upon detecting that the testing routine has reached an end-state. For example, if the user goal of the testing routine was to successfully make a call, an end-state of the testing routine may be that the call was successfully connected and then hung up, that the call was attempted but failed to connect, or that the call could not be attempted. A snapshot may indicate one of these states associated with successful achievement of the user goal, or another end-state indicating a failure to successfully achieve the user goal, and the process 900 can comprise responding to the request received at 902 with an indication whether the execution of the testing routing is a success or a failure at 918. However, if the testing routing has not yet reached an end-state, such as if the testing routine is still on-going and further actions could be performed, the process 900 can return to 904 to obtain a subsequent snapshot the testing management application 810 can use to determine such a further action to perform next.

Figure 10:
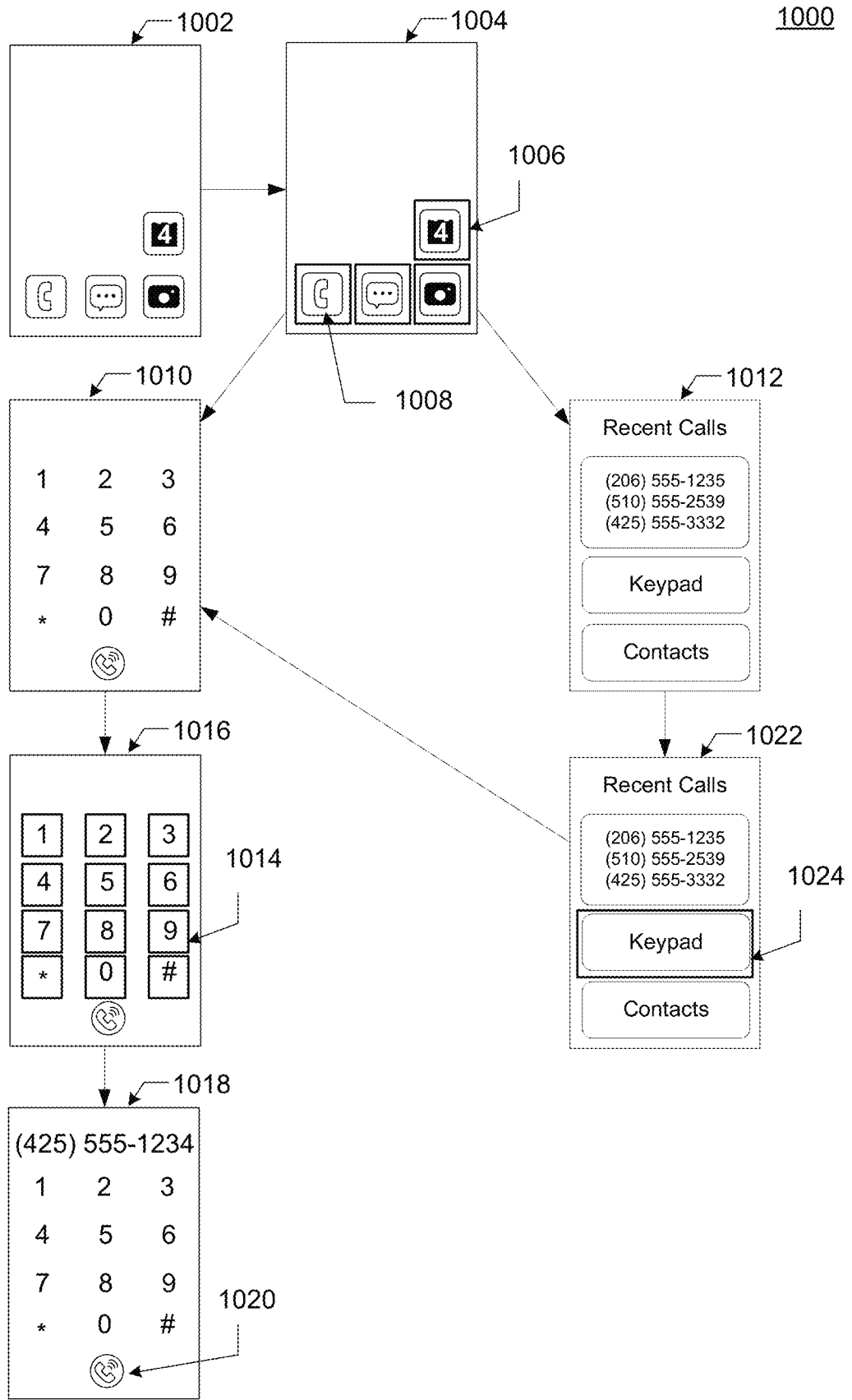
FIG. 10 depicts an example of a process in which a testing routine may be automated in accordance with at least some embodiments.

FIG. 10 depicts an example of a process 1000 in which a testing routine may be automated in accordance with at least some embodiments. The process 1000 can be performed based on screenshots of a display of a mobile device. The testing routine can be associated with a user goal of making a test telephone call from the mobile device. A testing management application that includes a behavioral model, such as the testing management application 810, can be configured to dynamically determine, based on screenshots, simulated user inputs to perform next during the testing routine to progress towards the user goal of making the test telephone call. A simulated user input comprises instructions that, when executed by a mobile device, a robotic arm, or other testing system, simulate a user touch at a particular location of the screen of the mobile device (e.g., by calling an API of the mobile device's OS responsible for detecting touchscreen input).

In the process 1000, a screenshot 1002 of a home screen of a user interface of the mobile device can be provided to the testing management application. As discussed above, when the testing management application receives a screenshot, the behavioral model of the testing management application can be configured to determine whether to invoke an object detector, an OCR model, and/or an action prediction model to evaluate the screenshot. Because the screenshot 1002 shows a home screen that the action prediction model may have been trained to process without additional data from the object detector or the OCR model, the behavioral model may invoke the action prediction model at 1004 to predict which of the icons 1006 shown in the home screen should be selected to proceed with the testing routine.

For example, the action prediction model can dynamically determine that to proceed towards the user goal of making the test telephone call, an icon 1008 that the action prediction model predicts is most likely to be associated with a telephone application should be selected with a corresponding simulated user input. The action prediction model may predict that icon 1008 should be selected, based on having been trained on training data indicating that testers selected icons on home screens that look the same or similar to icon 1008 in order to open telephone applications on test devices. Accordingly, the action prediction model may predict that icon 1008 should be selected, even if the icon 1008 is different from, and/or is located at a different location, than similar icons indicated in the training data. Based on identification of icon 1008 by the action prediction model, the testing management application can cause the mobile device, a robotic arm, or other testing system to select coordinates associated with the icon 1008.

Selection of the telephone application icon 1008 may, however, cause the mobile device to load different views or screens, depending on a last state of the telephone application, configuration settings, user preferences, operating system versions, differences between types of mobile devices, and/or other variables. For example, different operating systems, device types, and/or device configurations may respond differently to selection of a telephone application icon, for instance by loading different screens or views of a telephone application. For instance, in some examples selection of the telephone application icon 1008 may cause the mobile device to load a dialing screen with a keypad, as shown in screenshot 1010. However, in other examples, selection of the telephone application icon 1008 may instead cause the mobile device to load a list of recent calls, as shown in screenshot 1012. In still other examples, selection of the telephone application icon 1008 may cause the mobile device to load a list of contacts, a list of favorite contacts, a list of recently received calls, or any other screen or view associated with a telephone application.

A screenshot, such as screenshot 1010 or screenshot 1012, can be captured and provided to the testing management application following selection of the telephone application icon 1008, and the testing management application can provide the screenshot to the behavioral model. Depending on the state of the screenshot received by the behavioral model, the behavioral model may invoke one or more of the object detector, the OCR model, or the behavioral model to evaluate the screenshot and/or determine a next action to perform during the testing routine.

For example, if the testing management application receives the screenshot 1010 of the dialing screen in response to selection of the telephone application icon 1008 on the home screen, the behavioral model may invoke the object detector to identify the boundaries and locations of keys 1014 of the keypad, and/or other icons or objects associated with the keypad, as shown at 1016. In some examples, the testing management application may use the keys 1014 identified by the object detector to determine which keys 1014 should be selected, and/or in which order, to enter a predetermined phone number to be dialed during the testing routine. In other examples, the behavioral model may invoke the action prediction model to determine which keys 1014 to select, and/or in which order, to cause the mobile device to dial a telephone number associated with the test telephone call.

The testing management application can cause the mobile device, a robotic arm, or other testing system to select coordinates associated with the keys 1014 associated with numbers of the telephone number. Although not shown in FIG. 10, in some examples, additional screenshots can be captured and provided to the testing management application after selection of each number of the telephone number, such that the testing management application can determine which key to select next to dial the telephone number. In other examples, because the positions of the keys 1014 may be fixed, the testing management application can cause a sequence of numbers to be entered before the next screenshot is received, for instance to enter the full telephone number.

As discussed above, in some examples, the object detector can be configured to identify each of the keys 1014 and/or the numbers associated with each of the keys 1014, for instance if the numbers of the keys 1014 are relatively large. However, in other examples, the behavioral model may also invoke the OCR model to recognize numbers associated with the keys 1014, instead of or in addition to invoking the object detector.

After the testing management application causes selection of keys 1014 to dial the telephone number, screenshot 1018 may show that the full telephone number has been dialed. Based on screenshot 1018, the behavioral model may invoke the action prediction model to predict a next action that is likely to cause the mobile device to dial the entered telephone number. For example, the action prediction model can identify a dial icon 1020 below the keys 1014 that the action prediction model predicts can be selected to cause the mobile device to dial the telephone number and attempt to place a call. The action prediction model may predict that dial icon 1020 should be selected, based on having been trained on training data indicating that testers selected icons on dialing screens that look the same or similar to dial icon 1020 in order to cause test devices to dial entered telephone numbers. Accordingly, the action prediction model may predict that dial icon 1020 should be selected, even if the dial icon 1020 is different from, and/or is located at a different location, than similar icons indicated in the training data.

As discussed above, the initial selection of the telephone application icon 1008 on the home screen may have led directly to receipt of screenshot 1010 showing the dialing screen. However, if the testing management application did not receive the screenshot 1010 of the dialing screen in response to selection of the telephone application icon 1008 on the home screen, the action prediction model and/or other elements of the testing management application can dynamically determine simulated user actions predicted to cause the telephone application to display the dialing screen, or otherwise allow the telephone number to be entered and dialed. For instance, if selection of the telephone application icon 1008 caused screenshot 1012 to be displayed instead of screenshot 1010, the testing management application can use screenshot 1012 to dynamically determine a user input that is likely to lead the mobile device to a state in which the telephone number can be entered and dialed.

For example, screenshot 1012 primarily displays a list of recent calls, but also displays icons associated with the keypad and a contacts list. As shown at 1022, the behavioral model may invoke the object detector and/or the OCR model to identify objects and/or text in screenshot 1012, such as the list of recent calls, a keypad icon 1024, and a contacts list icon. The behavioral model may also, or alternatively, invoke the action prediction model to determine, based on the action prediction model having been trained on training data indicating that testers often selected buttons or icons associated with the term "keypad" or similar terms to cause a dialing screen to be loaded, that selection of the keypad icon 1024 is likely to cause the telephone application to load a dialing screen with a keypad. Accordingly, the testing management application can cause the mobile device, a robotic arm, or other testing system to select coordinates associated with the detected keypad icon 1024. Selection of the keypad icon 1024 can cause the telephone application to load the dialing screen, such that the testing management application can next receive a screenshot similar to screenshot 1010 that displays a keypad of the dialing screen that the testing management application can use to enter numbers of the telephone number as discussed above.

Accordingly, as shown in FIG. 10, the behavioral model of the testing management application can use screenshots to dynamically predict which user actions to perform next during the testing routine to make the test telephone call. Each screenshot may show a different state of the testing routine, and the behavioral model may determine to invoke any or all of the object detector, the OCR model, or the action prediction model to identify the current state of the testing routine and/or a next action to perform based on the current state of the testing routing. For example, even if different devices may not follow the same flow of steps or react in the same ways to similar user input, the behavioral model of the testing management application can use a most recent screenshot to determine the current state of the testing routine and/or to predict simulated user input likely to progress toward making the test telephone call during the testing routine.

Figure 11:
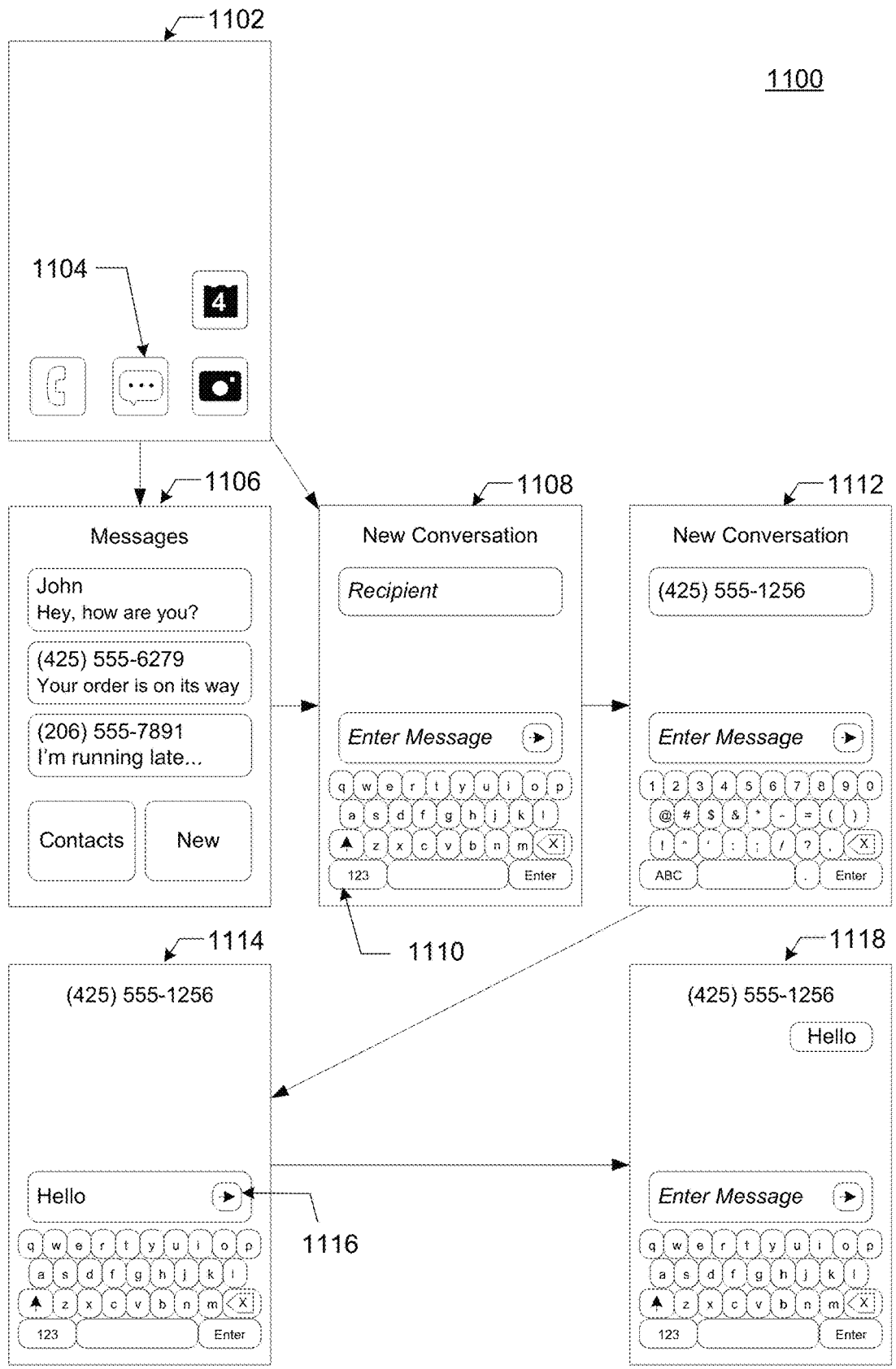
FIG. 11 depicts an example of a process in which a testing routine may be automated in accordance with at least some embodiments.

FIG. 11 depicts an example of a process 1100 in which a testing routine may be automated in accordance with at least some embodiments. The process 1100 can be performed based on screenshots of a display of a mobile device. The testing routine can be associated with a user goal of sending a test message, such as a short message service (SMS) message, multimedia messaging service (MMS) message, Rich Communication Services (RCS) message, or other types of message, from the mobile device. A testing management application that includes a behavioral model, such as the testing management application 810, can be configured to dynamically determine, based on screenshots, simulated user inputs to perform next during the testing routine to progress towards the user goal of sending the test message. A simulated user input comprises instructions that, when executed by a mobile device, a robotic arm, or other testing system, simulate a user touch at a particular location of the screen of the mobile device (e.g., by calling an API of the mobile device's OS responsible for detecting touchscreen input).

In the process 1100, a screenshot 1102 of a home screen of a user interface of the mobile device can be provided to the testing management application. As discussed above, when the testing management application receives a screenshot, the behavioral model of the testing management application can be configured to determine whether to invoke an object detector, an OCR model, and/or an action prediction model to evaluate the screenshot. Because the screenshot 1102 shows a home screen that the action prediction model may have been trained to process without additional data from the object detector or the OCR model, the behavioral model may invoke the action prediction model to predict which of the icons shown in the home screen should be selected to proceed with the testing routine.

For example, the action prediction model can dynamically determine that to proceed towards the user goal of sending the test message, an icon 1104 that the action prediction model predicts is most likely to be associated with a messaging application should be selected with a corresponding simulated user input. The action prediction model may predict that icon 1104 should be selected, based on having been trained on training data indicating that testers selected icons on home screens that look the same or similar to icon 1104 in order to open messaging applications on test devices. Accordingly, the action prediction model may predict that icon 1104 should be selected, even if the icon 1104 is different from, and/or is located at a different location, than similar icons indicated in the training data. Based on identification of icon 1104 by the action prediction model, the testing management application can cause the mobile device, a robotic arm, or other testing system to select coordinates associated with the icon 1104.

Selection of the messaging application icon 1104 may, however, cause the mobile device to load different views or screens, depending on a last state of the messaging application, configuration settings, user preferences, operating system versions, differences between types of mobile devices, and/or other variables. For example, different operating systems, device types, and/or device configurations may respond differently to selection of a messaging application icon, for instance by loading different screens or views of a messaging application. For instance, in some examples selection of the messaging application icon 1104 may cause the mobile device to load a view showing a list of messages associated with recent conversations, an option to load a contacts lists, and/or an option to initiate a new conversation, as shown in screenshot 1106. However, in other examples, selection of the messaging application icon 1104 may instead cause the mobile device to load a view associated with initiation of a new conversation, as shown in screenshot 1108. In still other examples, selection of the messaging application icon 1104 may cause the mobile device to load a list of messaging contacts, a list of favorite messaging contacts, a list of recently sent messages, a list of recently received messages, or any other screen or view associated with a messaging application.

A screenshot, such as screenshot 1106 or screenshot 1108, can be captured and provided to the testing management application following selection of the messaging application icon 1104, and the testing management application can provide the screenshot to the behavioral model. Depending on the state of the screenshot received by the behavioral model, the behavioral model may invoke one or more of the object detector, the OCR model, or the behavioral model to evaluate the screenshot and/or determine a next action to perform during the testing routine.

For example, if the testing management application receives the screenshot 1108, associated with initiation of a new conversation, in response to selection of the messaging application icon 1104 on the home screen, the behavioral model may invoke the object detector to identify objects shown in screenshot 1108 and/or invoke the OCR model to identify text shown in screenshot 1108. For instance, the behavioral model may determine to invoke the object detector to identify the location of a "recipient" field where a telephone number of a recipient for the test message can be entered, and/or to identify the location of an "enter message" field where the text of the test message can be entered. The behavioral model may also determine to use the OCR model to recognize numbers, letters, or other characters or text associated with keys of a keyboard shown in screenshot 1108.

The behavioral model can also invoke the action prediction model to determine which of the keys or objects to select to cause the mobile device to enter a telephone number into the identified "recipient" field. For example, the action prediction model may predict that, to enter the telephone number for the recipient of the test message, a keyboard button 1110 with the identified text "123" should be selected to cause the displayed keyboard to switch from displaying keys with letters to displaying keys with numbers, as shown in screenshot 1112.

The behavioral model may again invoke the object detector and/or OCR model to identify keys and corresponding numbers and characters shown in screenshot 1112. The action prediction model, and/or other elements of the testing management application, can dynamically determine which keys of the keyboard to select to enter the recipient telephone number into the "recipient" field, and also determine which button or object to select to return to the letter-based keyboard display as shown in screenshot 1114. The action prediction model, and/or other elements of the testing management application, can similarly use screenshot 1114 to dynamically determine which keys of the letter-based keyboard to select to enter the text of the test message, and which object is an "enter" button 1116 that can be selected to cause the mobile device to transmit the test message to the recipient telephone number as shown in screenshot 1118.

The testing management application can cause the mobile device, a robotic arm, or other testing system to select coordinates of identified objects associated with actions determined by the action prediction model. Although not shown in FIG. 11, in some examples, additional screenshots can be captured and provided to the testing management application after selection of each object during the testing process, such that the testing management application can determine which key to select next to enter the telephone number, which key to select next to enter the text of the test message, or which object to select to send the test message. In other examples, because the positions of the keys or other objects may be fixed, the testing management application can cause a sequence of keys to be selected before the next screenshot is received, for instance to enter the full recipient telephone number or full text of the test message.

Although in some situations selection of the messaging application icon 1104 on the home screen can cause the mobile device to load a new conversation view as shown in screenshot 1108, in other situations the mobile device may display the view shown in screenshot 1106 or another view in response to selection of the messaging application icon 1104. In these examples, the behavioral model of the testing management application can invoke one or more elements to identify objects and predict which of the objects, if selected, is likely to allow the testing routine to proceed towards entering and/or sending the test message. For instance, if the testing management application receives screenshot 1106, the testing management application may determine that an object labeled "new" should be selected to cause the messaging application to load the new conversion view shown in screenshot 1108. Alternatively, if the testing management application receives screenshot 1106, and the recipient telephone number for the test message is associated with a message in the list of recent conversations, the testing management application may determine that a corresponding entry in the list of recent conversations can be selected to load a conversation view where text of the test message can be entered.

Accordingly, as shown in FIG. 11, the testing management application can use screenshots to dynamically predict which user actions to perform next during the testing routine to send the test message. Each screenshot may show a different state of the testing routine, and the behavioral model may determine to invoke any or all of the object detector, the OCR model, or the action prediction model to identify the current state of the testing routine and/or a next action to perform based on the current state of the testing routing. For example, even if different devices may not follow the same flow of steps or react in the same ways to similar user input, the behavioral model of the testing management application can use a most recent screenshot to determine the current state of the testing routine and/or to predict simulated user input likely to progress toward sending the test message during the testing routine.

Figure 12:
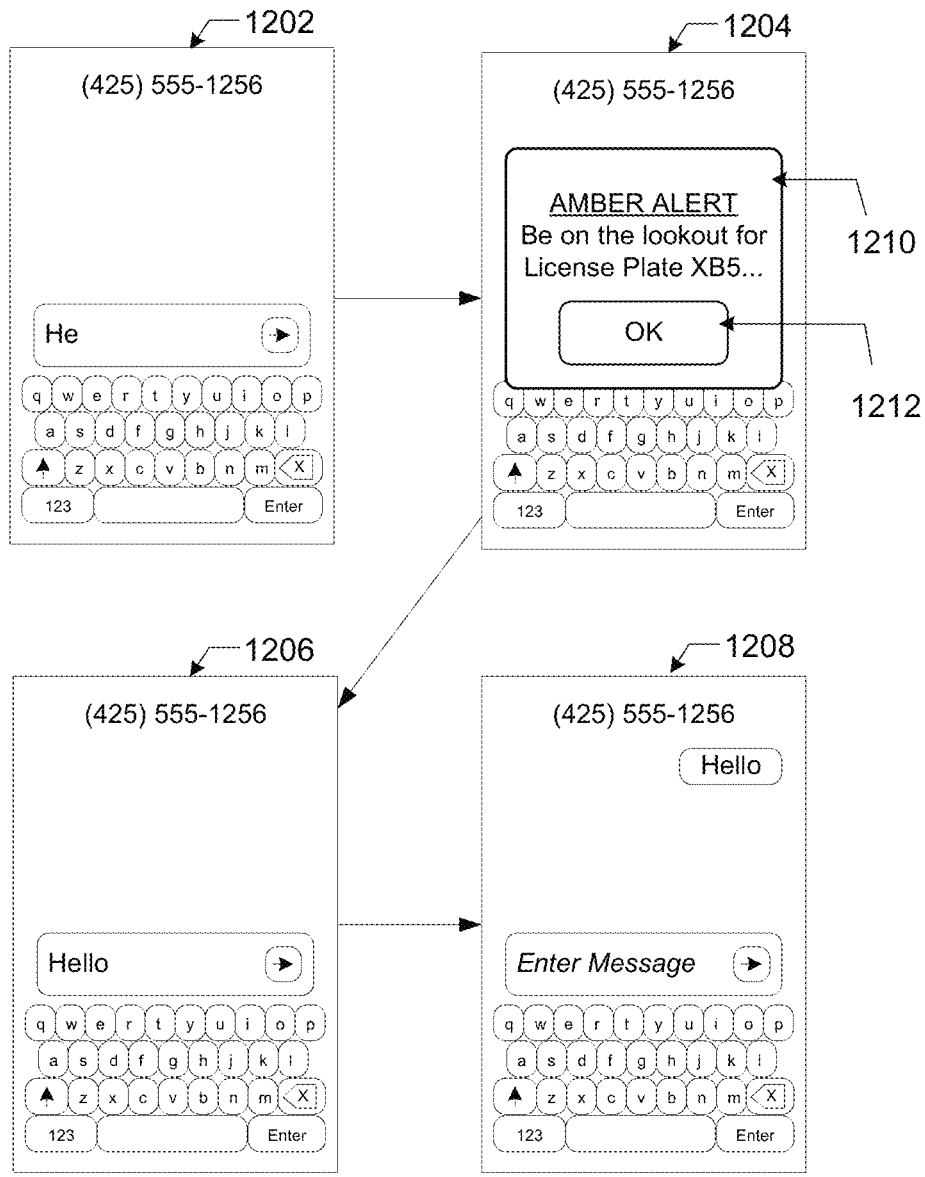
FIG. 12 depicts an example of a process in which a testing routine may be automated in accordance with at least some embodiments.

FIG. 12 depicts an example of a process 1200 in which a testing routine may be automated in accordance with at least some embodiments. The process 1200 can be performed based on screenshots of a display of a mobile device. A testing management application that includes a behavioral model, such as the testing management application 810, can be configured to dynamically determine, based on screenshots 1202-1208, simulated user inputs to perform next during the testing routine to progress towards the user goal of sending the test message. A simulated user input comprises instructions that, when executed by a mobile device, a robotic arm, or other testing system, simulate a user touch at a particular location of the screen of the mobile device (e.g., by calling an API of the mobile device's OS responsible for detecting touchscreen input).

In process 1200, the testing management application can use a most recent screenshot to dynamically predict which actions to take next during a testing routine associated with a user goal, such as making a telephone call as discussed above with respect to FIG. 10 or sending a test message as discussed above with respect to FIG. 11. However, during the testing process, a pop-up object 1210 unrelated to the testing routine or the user goal may be displayed in one or more of the screenshots 1202-1208. For example, the pop-up object 1210 can be associated with an amber alert, an emergency alert, a presidential alert, a notification from an application executing on the mobile device, or any other type of alert, notification, message, or other object. The pop-up object 1210 may block or overlay other objects in the screenshot, prevent user input associated with other objects, and/or otherwise interrupt the testing routine.

However, the testing management application can invoke one or more of an object detector, an OCR model, and/or an action predictor to identify the pop-up object 1210 and determine an action likely to dismiss the pop-up object 1210 in order to resume the testing routine. For example, the testing management application can invoke an object detector of the behavioral model, such as object detector 816, to identify the pop-up object 1210 and/or component or associated objects. The testing management application can also invoke an OCR model of the behavioral model, such as OCR model 818 to recognize and/or interpret text or other characters associated with the pop-up object 1210.

The testing management application can additionally invoke an action prediction model of the behavioral model, such as action prediction model 820, to dynamically predict an action likely to remove or dismiss the pop-up object 1210. In some examples, the action prediction model may use data provided by the object detector and/or the OCR model to determine the action likely to remove or dismiss the pop-up object 1210. The action prediction model may also, or alternately, determine the action based on having been trained on data indicating user actions that users took to dismiss pop-up messages on test devices. Accordingly, the action prediction model may predict that a particular action should be taken to remove or dismiss the pop-up object 1210, even if the pop-up object 1210 is different from, and/or is located at a different location, than similar pop-up objects indicated in the training data. The testing management application can accordingly cause simulated user input associated with the action to be performed on the mobile device. The simulated user input can lead to removal or dismissal of the pop-up object 1210, such that the pop-up object 1210 is absent from the next screenshot received by the testing management application and the testing routine can continue following the interruption.

As a non-limiting example, the object detector and/or the OCR model can identify an "OK" button 1210 associated with the pop-up object 1210 shown in screenshot 1204. The action prediction model can determine, based on having been trained on training data indicating that testers often selected buttons or icons associated with the term "OK" or similar terms to dismiss notifications or other pop-up messages, that selection of the detected "OK" button 1210 is likely to result in removal of the pop-up object 1210. Accordingly, the testing management application can cause simulated user input associated with selection of the "OK" button 1210 to be performed on the mobile device. Selection of the "OK" button 1210 can dismiss the pop-up object 1210, such that the pop-up object 1210 is not present in the next screenshot 1206. The testing management application can use screenshot 1206 to determine a next action to perform to continue the testing routine after dismissal of the pop-up object 1210, such that the testing routine can continue instead of failing due to the pop-up object 1210.

Accordingly, as shown in FIG. 12, the testing management application can use screenshots to dynamically predict which user actions to perform to dismiss pop-up objects, or other unexpected objects, that are displayed during a testing routine and/or may disrupt the testing routine. In some examples, the OCR model and/or a corresponding NLP component can determine the meaning of a message displayed by a pop-up object, and provide corresponding information that allows the action prediction model to determine the nature of the pop-up object and dynamically determine how to dismiss the pop-up object. In some examples, the text displayed in association with a pop-up message may be unique, or be text that was not encountered during capture of the training data set upon which the action prediction model was trained. However, the training data set may indicate how testers dismissed other types of pop-up messages or objects, such that the action prediction model can be trained to predict how to dismiss any type of pop-up message that may be displayed unexpectedly during a testing routine. As such, the action prediction model can allow testing routines to be completed even if unexpected pop-up objects are displayed during the testing routines.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A computer-implemented method, comprising:
   training a behavioral model, comprising an action prediction machine learning model, based on training data, wherein:
      the training data indicates user actions, taken by one or more users during manual use of one or more test devices, that led to the one or more test devices performing a particular target activity, and
      the training identifies behavior, associated with the user actions, likely to lead towards performance of the particular target activity;
   receiving, during an automated testing routine associated with a user goal on a mobile device different from the one or more test devices, a screenshot of the mobile device, wherein;
      the user goal comprises performance of the particular target activity by the mobile device;
   dynamically predicting, using the action prediction machine learning model based on the behavior identified during the training of the behavioral model, and based on analysis of the screenshot, a next action likely to cause progress towards achievement of the user goal on the mobile device during the automated testing routine, wherein:
      the next action comprises selection of particular coordinates associated with an object shown in the screenshot; and
   causing the selection of the particular coordinates associated with the object on the mobile device.

2. The computer-implemented method of claim 1, wherein the behavioral model further comprises:
   an object detector configured to identify, based on the screenshot, at least one of boundaries or coordinates of one or more objects, including the object, shown in the screenshot; and
   an optical character recognition (OCR) model configured to recognize text associated with the one or more objects.

3. The computer-implemented method of claim 2, wherein the behavioral model is configured to determine whether to invoke one or more of the object detector or the OCR model, in addition to invoking the action prediction machine learning model, during analysis of the screenshot.

4. The computer-implemented method of claim 2, wherein the action prediction machine learning model is a first machine learning model of the behavioral model, and the OCR model is a second machine learning model of the behavioral model.

5. The computer-implemented method of claim 1, wherein causing the selection of the particular coordinates associated with the object on the mobile device comprises transmitting an instruction to a testing application executing on the mobile device, or to a robot arm, to simulate a user touch at the particular coordinates associated with the object.

6. The computer-implemented method of claim 1, wherein:
   the screenshot shows a pop-up object that is not associated with the automated testing routine or the user goal, and the object is a user interface element, associated with the pop-up object, that the action prediction machine learning model of the behavioral model predicts is likely to, if selected, cause dismissal of the pop-up object.

7. The computer-implemented method of claim 1, further comprising:
receiving, during the automated testing routine, a second screenshot of the mobile device following the selection of the particular coordinates associated with the object on the mobile device;
dynamically predicting, using the action prediction machine learning model based on the behavior identified during the training of the behavioral model, and based on analysis of the second screenshot, a second next action likely to cause further progress towards the achievement of the user goal on the mobile device during the automated testing routine, wherein:
the second next action comprises a second selection of second coordinates associated with a second object shown in the second screenshot; and
causing the second selection of the second coordinates associated with the second object on the mobile device.

8. The computer-implemented method of claim 1, wherein the particular target activity, associated with the user goal, comprises the mobile device making a test telephone call.

9. The computer-implemented method of claim 1, wherein the particular target activity, associated with the user goal, comprises the mobile device sending a test text message.

10. The computer-implemented method of claim 1, wherein the mobile device, associated with the automated testing routine, is associated with at least one of a different operating system, a different device type, or a different user interface than the one or more test devices used manually by the one or more users.

11. The computer-implemented method of claim 1, wherein:
the one or more users followed a predefined series of steps of a test flow associated with the particular target activity during the manual use of the one or more test devices, and
the action prediction machine learning model dynamically predicts the next action based on the behavior identified during the training of the behavioral model and the analysis of the screenshot, and without using the predefined series of steps of the test flow.

12. One or more computing devices, comprising:
one or more processors; and
memory storing computer-executable instructions that, when executed by the one or more processors, cause the one or more processors to perform operations comprising:
training a behavioral model, comprising an action prediction machine learning model, based on training data, wherein:
the training data indicates user actions, taken by one or more users during manual use of one or more test devices, that led to the one or more test devices performing a particular target activity, and
the training identifies behavior, associated with the user actions, likely to lead towards performance of the particular target activity;
receiving, during an automated testing routine associated with a user goal on a mobile device different from the one or more test devices, a screenshot of the mobile device, wherein;
the user goal comprises performance of the particular target activity by the mobile device;
dynamically predicting, using the action prediction machine learning model based on the behavior identified during the training of the behavioral model, and based on analysis of the screenshot, a next action likely to cause progress towards achievement of the user goal on the mobile device during the automated testing routine, wherein;
the next action comprises selection of particular coordinates associated with an object shown in the screenshot; and
causing the selection of the particular coordinates associated with the object on the mobile device.

13. The one or more computing devices of claim 12, wherein the behavioral model further comprises:
an object detector configured to identify, based on the screenshot, at least one of boundaries or coordinates of one or more objects, including the object, shown in the screenshot; and
an optical character recognition (OCR) model configured to recognize text associated with the one or more objects.

14. The one or more computing devices of claim 12, wherein causing the selection of the particular coordinates associated with the object on the mobile device comprises transmitting an instruction to a testing application executing on the mobile device, or to a robot arm, to simulate a user touch at the particular coordinates associated with the object.

15. The one or more computing devices of claim 12, wherein:
the screenshot shows a pop-up object that is not associated with the automated testing routine or the user goal, and
the object is a user interface element, associated with the pop-up object, that the action prediction machine learning model of the behavioral model predicts is likely to, if selected, cause dismissal of the pop-up object.

16. One or more non-transitory computer-readable media storing computer-executable instructions that, when executed by one or more processors, cause the one or more processors to perform operations comprising:
training a behavioral model, comprising an action prediction machine learning model, based on training data, wherein:
the training data indicates user actions, taken by one or more users during manual use of one or more test devices, that led to the one or more test devices performing a particular target activity, and
the training identifies behavior, associated with the user actions, likely to lead towards performance of the particular target activity;
receiving, during an automated testing routine associated with a user goal on a mobile device different from the one or more test devices, a screenshot of the mobile device, wherein;
the user goal comprises performance of the particular target activity by the mobile device;
dynamically predicting, using the action prediction machine learning model based on the behavior identified during the training of the behavioral model, and based on analysis of the screenshot, a next action likely to cause progress towards achievement of the user goal on the mobile device during the automated testing routine, wherein:

the next action comprises selection of particular coordinates associated with an object shown in the screenshot; and causing the selection of the particular coordinates associated with the object on the mobile device.

17. The one or more non-transitory computer-readable media of claim 16, wherein the behavioral model further comprises:

an object detector configured to identify, based on the screenshot, at least one of boundaries or coordinates of one or more objects, including the object, shown in the screenshot; and an optical character recognition (OCR) model configured to recognize text associated with the one or more objects.

18. The one or more non-transitory computer-readable media of claim 16, wherein causing the selection of the particular coordinates associated with the object on the mobile device comprises transmitting an instruction to a testing application executing on the mobile device, or to a robot arm, to simulate a user touch at the particular coordinates associated with the object.

19. The one or more non-transitory computer-readable media of claim 16, wherein:

the screenshot shows a pop-up object that is not associated with the automated testing routine or the user goal, and the object is a user interface element, associated with the pop-up object, that the action prediction machine learning model of the behavioral model predicts is likely to, if selected, cause dismissal of the pop-up object.

20. The one or more non-transitory computer-readable media of claim 16, wherein the operations further comprise:

receiving, during the automated testing routine, a second screenshot of the mobile device following the selection of the particular coordinates associated with the object on the mobile device;

dynamically predicting, using the action prediction machine learning model based on the behavior identified during the training of the behavioral model, and based on analysis of the second screenshot, a second next action likely to cause further progress towards the achievement of the user goal on the mobile device during the automated testing routine, wherein:

the second next action comprises a second selection of second coordinates associated with a second object shown in the second screenshot; and causing the second selection of the second coordinates associated with the second object on the mobile device.

* * * * *